United States Patent
Koo

(10) Patent No.: US 11,455,062 B2
(45) Date of Patent: Sep. 27, 2022

(54) NON-CONTACT TYPE TOUCH PANEL SYSTEM, METHOD OF CONTROLLING SAME, AND NON-CONTACT TYPE INPUT DEVICE MOUNTABLE ON EXISTING TOUCH SCREEN

(71) Applicant: GTT CO., LTD., Paju-si (KR)

(72) Inventor: Nam Kyu Koo, Paju-si (KR)

(73) Assignee: GTT CO., LTD., Gyeonggi-Do (KR)

( * ) Notice: Subject to any disclaimer, the term of this patent is extended or adjusted under 35 U.S.C. 154(b) by 23 days.

(21) Appl. No.: 17/142,450

(22) Filed: Jan. 6, 2021

(65) Prior Publication Data

US 2021/0373702 A1    Dec. 2, 2021

Related U.S. Application Data

(63) Continuation of application No. PCT/KR2020/016649, filed on Nov. 24, 2020.

(30) Foreign Application Priority Data

May 27, 2020    (KR) .................. 10-2020-0063381
Jun. 3, 2020    (KR) .................. 10-2020-0066800
Jun. 8, 2020    (KR) .................. 10-2020-0069138

(51) Int. Cl.
    *G06F 3/042*    (2006.01)
(52) U.S. Cl.
    CPC .. *G06F 3/0421* (2013.01); *G06F 2203/04108* (2013.01)

(58) Field of Classification Search
    CPC ......... G06F 3/0421; G06F 2203/04108; G06F 3/043; G06F 3/0488; G06F 3/0428
    See application file for complete search history.

(56) References Cited

U.S. PATENT DOCUMENTS

| 2011/0193802 A1* | 8/2011 | Park | G06F 3/0412 |
|---|---|---|---|
| | | | 345/173 |
| 2013/0093860 A1 | 4/2013 | Shimotani et al. | |
| 2018/0011605 A1 | 1/2018 | Otsubo | |
| 2019/0294299 A1 | 9/2019 | Otsubo | |

FOREIGN PATENT DOCUMENTS

| JP | 2013214274 | 10/2013 |
|---|---|---|
| KR | 20050095215 | 9/2005 |
| KR | 20090092878 | 9/2009 |
| KR | 100931189 | 12/2009 |
| KR | 100935503 | 1/2010 |

(Continued)

*Primary Examiner* — Patrick N Edouard
*Assistant Examiner* — Joseph P Fox
(74) *Attorney, Agent, or Firm* — Cantor Colburn LLP

(57) ABSTRACT

Provided are a non-contact type touch panel system that enables a user to input information even without touching a display panel with a finger, and a method of controlling the system. Further, a non-contact type touch panel display structure is also proposed. The non-contact type touch panel display structure can maximally prevent direct contact by a user when the user inputs information to a touch panel because a touch screen is spaced apart from the outer edges of a display. Further, the non-contact type touch panel display structure has a function of enabling a user to visually or aurally recognize information when the information is input in a non-contact type.

9 Claims, 25 Drawing Sheets

(56) References Cited

FOREIGN PATENT DOCUMENTS

| | | |
|---|---|---|
| KR | 100946624 | 3/2010 |
| KR | 20110041331 | 4/2011 |
| KR | 101131373 | 4/2012 |
| KR | 20120063423 | 6/2012 |
| KR | 20160013563 | 2/2016 |
| KR | 101675228 | 11/2016 |
| KR | 101766978 | 8/2017 |
| KR | 20180031234 | 3/2018 |
| KR | 102218967 | 2/2021 |
| WO | 2018207490 | 11/2018 |
| WO | 2018216619 | 11/2018 |

* cited by examiner

NON-CONTACT TYPE TOUCH PANEL SYSTEM, METHOD OF CONTROLLING SAME, AND NON-CONTACT TYPE INPUT DEVICE MOUNTABLE ON EXISTING TOUCH SCREEN

TECHNICAL FIELD

The present disclosure relates to a non-contact type touch panel system that enables a user to input information even without touching a display panel with a finger, and a method of controlling the non-contact type touch panel system. Further, the present disclosure relates to a modularized detachable input device for implementing a non-contact touch, the input device being mountable on existing touch screens and enabling a user to recognize completion of non-contact input.

BACKGROUND ART

In general, a display panel, which is a device visually showing data, is one of representative output devices such as a computer. As such a display panel, there are many kinds of display panels such as a Cathode Ray Tube (CRT), a Light Emitting Diode (LED), a Thin-Film-Transistor Liquid-Crystal Display (TFT-LCD), and a Plasma Display Panel (PDP).

Recently, touch screens that enable specific processing to be performed by stored software by detecting the position when a hand of a person or an object touches a character or a specific position on a screen without using a keyboard, etc., are attached to display panels and frequently used.

A touch screen is implemented by attaching a device called a touch panel to the screen of a common display panel to show the function. Such a touch panel has a function of detecting the position when a mesh is touched by a fingertip or other objects by emitting an invisible infrared ray, etc. up, down, left, and right to make a large number of rectangular meshes on a screen.

Accordingly, when character or picture information displayed on a screen equipped with a touch screen is touched by a finger, the portion selected by the user is determined and a computer processes a corresponding instruction, whereby the user can very easily obtain the information that he/she wants.

For this characteristic of touch panel screens, touch panels are frequently used for information software at public places, that is, a subway, a department store, a bank, etc., are applied a lot to terminals for selling at various stores, and are used also for the panel of mobile phones or for general work.

However, touch panel screens of the related art are not equipped with a particular sterilizer even though they are touched hundreds of times a day, so there is a problem that people who use the touch screens are exposed to bacterial infection.

Many touch screens that are operated in a non-contact type have been recently developed to solve the problem of infection. However, since a display screen and a touch panel are on the same surface in the non-contact touch screens of the related art, users may have difficulty in recognizing touching a space (non-contact type).

That is, users keep intending to operate such non-contact touch panel screens in the screen touch type, which they are familiar with, without recognizing that the touch panel screens are operated in a non-contact type. Accordingly, the display panel is still touched by hands, so it is difficult to take the advantage of the non-contact touch panel and there is still a high possibility of exposure to bacterial infection.

Further, when a touch screen is disposed ahead of a display with a gap therebetween to solve this problem, there is a problem that a touch is not clearly recognized around the corners, touching is limited due to a large depth, and fingers unavoidably touch the edges of an infrared touch frame in order to touch portions close to the corners.

There is another problem that, due to the characteristics of the non-contact touch screen, users have difficulty in recognizing whether a touch is not made, whether a desired position has been accurately touched, or whether he/she has finished touching.

The description provided above as a related art of the present disclosure is just for helping understanding the background of the present disclosure and should not be construed as being included in the related art known by those skilled in the art.

DISCLOSURE

Technical Problem

The present disclosure has been made in an effort to solve the problems in the related art and an objective of the present disclosure is to provide a non-contact type touch panel system that can maximally reduce the possibility of bacterial infection due to contact with a display because a user can easily and naturally perform a non-contact touch by employing a display that displays a 3D image and a touch screen that operates in a non-contact type, and a method of controlling the non-contact type touch panel system.

Another objective of the present disclosure is to provide a non-contact type touch panel system that enables a user to easily visually or aurally recognize a touch when performing the touch, and a method of controlling the non-contact type touch panel system.

Another objective of the present disclosure is to provide a non-contact type touch panel display structure that can maximally prevent contact of the user's body when the user inputs information through a touch panel by spacing a touch screen apart from the outer edges of a display.

Another objective of the present disclosure is to provide a non-contact type touch panel display structure that enables a user to easily recognize whether information is input by emitting light through a light emitter when input of information by a user in a non-contact type is recognized.

Another objective of the present disclosure is to provide a non-contact type touch panel display structure that can achieve the same effect as when selection (clicking) is performed through a computer mouse by dualizing a touch screen and a click-informing unit.

Another objective of the present disclosure is to provide a detachable input device for implementing a non-contact touch which is integrally modularized to be able to be easily installed in an existing touch display and easily replace if the input device breaks. Another objective of the present disclosure is to provide a modularized detachable input device for implementing a non-contact touch which has a haptic function of informing a user that a non-contact input is completed.

Another objective of the present disclosure is to provide a modularized detachable input device that is composed of two bars, thereby being able to be easily applied to various displays and to apply a non-contact touch only in a predetermined section.

The technical subjects to implement in the present disclosure are not limited to the technical problems described above and other technical subjects that are not stated herein will be clearly understood by those skilled in the art from the following specifications.

Technical Solution

In order to achieve the objectives, a non-contact type touch panel system according to an embodiment of the present disclosure includes: a display configured to display a 3D image or picture on a screen; and a touch screen formed in a rectangular ring shape, disposed over a front surface of the display, and sensing a position of input coordinates, in which a predetermined gap is defined in a front-rear direction between the display and the touch screen, so the touch screen is spaced apart from the display.

Further, in the non-contact type touch panel system according to an embodiment of the present disclosure, the display the display may include a display unit displaying a 3D image or picture and having an Analog-to-Digital (AD) board disposed therein.

Further, in the non-contact type touch panel system according to an embodiment of the present disclosure, the touch screen may include a sensor unit including several generator and sensors and a touch controller sensing a touch signal from the sensor unit and converting the touch signal into input coordinates.

Further, the non-contact type touch panel system according to an embodiment of the present disclosure may further include a display module disposed on the AD board and receiving input coordinate data from the touch controller and controlling the display unit on the basis of the input coordinate data such that a predetermined touch symbol is output.

Further, the AD board of the display may be connected to the touch controller of the touch screen, may directly receive touch signal data and input coordinate data transmitted from the touch controller, and may directly control the sensor unit of the touch screen.

The predetermined touch symbol may be independently output on the display unit through the AD board of the display rather than through a PC system on the basis of the input coordinate date transmitted to the touch controller to the AD board.

Further, the non-contact type touch panel system according to an embodiment of the present disclosure may further include: an LED assistant coupled to edges of the sensor unit, connected to the AD board, and emitting light; and a visual display module disposed on the AD board, receiving input coordinate data from the touch controller, and controlling a voltage such that the LED assistant can operate.

Further, the non-contact type touch panel system according to an embodiment of the present disclosure may further include: a speaker coupled to edges of the sensor unit, connected to the AD board, and outputting a sound; and a sound module disposed on the AD board, receiving input coordinate data from the touch controller, and controlling signal such that the speaker can operate.

Further, the non-contact type touch panel system according to an embodiment of the present disclosure may further include actuators coupled to both sides of the display, having front ends connected to the touch screen, and moving the touch screen forward and backward, in which a gap between the display and the touch screen may be adjusted by operation of the actuators.

Meanwhile, a method of controlling a non-contact type touch panel system according to an embodiment of the present disclosure includes: sensing a touch signal by means of a touch screen formed in a rectangular ring shape; converting the touch signal into input coordinates by means of a touch controller of the touch screen; transmitting touch signal data and input coordinate data to an AD board connected to the touch controller; and operating a user-informing module disposed on the AD board.

The operating of a user-informing module includes: transmitting the input coordinate data to a display module on the AD board from the touch controller; and outputting a predetermined touch symbol on a display unit of the display by means of the display module.

The AD board of the display may be connected to the touch controller of the touch screen, may directly receive touch signal data and input coordinate data transmitted from the touch controller, and may directly control the sensor unit of the touch screen.

The predetermined touch symbol may be independently output on the display through the AD board of the display rather than through a PC system on the basis of the input coordinate date transmitted to the touch controller to the AD board.

Meanwhile, a modularized detachable input device for implementing a non-contact touch according to an embodiment of the present disclosure includes: a body casing having several rails longitudinally formed therein; a touch board longitudinally inserted in the rails and sensing a position of input coordinates; a haptic board inserted in another one of the rails; and a light emitter disposed on a side of the body casing and emitting light when a touch signal is sensed by the touch board.

The light emitter includes: a light source casing coupled to a side of the body casing and having a light source hole; a light diffusion cover inserted in the light source hole of the light source casing and transmitting light frontwards; a light source coupled to a side of the haptic board and radiating light; a light guide plate coupled to a rear surface of the light diffusion cover and diffusing light radiated from the light source to the light diffusion cover; and a reflection sheet coupled to a rear surface of the light guide plate.

The light diffusion cover includes: a diffusion base formed to be able to come in contact with a front surface of the light guide plate; and a diffusion insert protruding from a front surface of the diffusion base and having a size smaller than the diffusion base to be able to be inserted in the light source hole.

Accompanying technological components for achieving the objectives will be described in detail below with reference to the accompanying drawings.

Advantageous Effects

According to the present disclosure having the above configuration, since the touch screen operating in a non-contact type is spaced apart from the display configured to display a 3D image on a screen, there is the advantage that unnatural feeling of a user is remarkably reduced and the present disclosure can be easily applied to various devices and can be achieved at a low cost.

Further, there is the advantage that since the display and the touch screen are spaced apart from each other, there is little possibility that a user directly touches the display, and accordingly, the possibility of exposure to bacterial infection is remarkably reduced.

Further, there is the advantage that since the AD board directly connected to the display can output at touch symbol, light, or a sound when there is a touch, delay is less and whether there is a touch can be quickly recognized.

Further, there is the advantage that since the visual/aural information ability is improved, it is possible to easily determine whether there is a touch, so it is possible to easily induce a non-contact touch of a user.

According to the present disclosure having the above configuration, since the display and the touch screen are spaced apart from each other in the front-rear direction, there is an effect that there is less possibility that a user directly touches the display and accordingly the possibility of exposure to bacterial infection is remarkably reduced.

Further, since the touch screen is spaced apart from the display up, down, left, and right, it is possible to easily and accurately touch the corners of a display region and it is possible to remarkably reduce the possibility that a user touches the frame when touching.

Further, the present disclosure has the advantage that since the light emitter is provided and can visually inform a user of a touch when sensing the touch, the user can clearly recognize whether there is a touch.

Further, the present disclosure has the advantage that since it is possible to emit light simultaneously forward from the display and to the front of the display using one light source, it is possible to easily inform people standing around that the product is being used, and there is a great advantage in terms of cost.

According to the present disclosure having the above configuration, since the display and the touch screen are spaced apart from each other in the front-rear direction, there is an effect that there is less possibility that a user directly touches the display and accordingly the possibility of exposure to bacterial infection is remarkably reduced.

Further, the present disclosure has the advantage that since the touch screen is spaced left and right apart from the display and the click-informing unit is spaced up and down apart from the display, it is possible to easily and accurately touch even the corners of the display region and it is possible to remarkably reduce the possibility that the user's body touches the frame when touching.

Further, the present disclosure has the advantage that since the touch screen can recognize input coordinates and the click-informing unit can recognize whether there is selection (a click), it is possible to achieve the same effect as when clicking through a computer mouse.

Further, the present disclosure is very advantageous in terms of cost because the Y-axial transmitter of the click-informing unit is implemented as a single infrared LED-bar.

The present disclosure has an effect that since the non-contact touch device is implemented in an integral module, unnecessary parts are removed, so the manufacturing cost is low and maintenance is easy because the device can be detachably installed in a display.

Further, the present disclosure has the advantage that since the non-contact input device can be directly mounted in an existing display using the coupler and the input device can be implemented by two bars, the input device can be easily applied to various displays.

Further, according to the present disclosure there is the advantage that it is possible to apply the input device to a curved display and install the input device at the upper end or the lower end of a display so that a non-contact touch can occur in only a predetermined section by reducing the size.

Further, according to the present disclosure, when a touch is sensed, there is the advantage that it is possible to inform the user of the touch using both of light and a sound, so the user can clearly recognize whether a touch is completed.

DESCRIPTION OF DRAWINGS

FIGS. 14 to 19 are views showing modified examples having an additional function, that is, an additional function that can make a user recognize whether there is a click in a non-contact touch panel display structure of the present disclosure, wherein FIG. 14 is a view showing the front of a non-contact touch panel display structure having a click recognition function according to the present disclosure, FIG. 15 is a horizontal cross-sectional view of the non-contact touch panel display structure having a click recognition function of the present disclosure, FIG. 16 is a vertical cross-sectional view of the non-contact touch panel display structure having a click recognition function of the present disclosure, FIG. 17 is a view showing a point where input coordinates are sensed in the non-contact touch panel display structure having a click recognition function of the present disclosure, FIG. 18 is a view showing a point where whether there is a touch is sensed in the non-contact touch panel display structure having a click recognition function of the present disclosure, and FIG. 19 is a view showing the front of a non-contact touch panel display structure having a click recognition function according to a modified embodiment of the present disclosure.

DETAILED DESCRIPTION OF MAIN PARTS IN DRAWINGS

Figure 1:
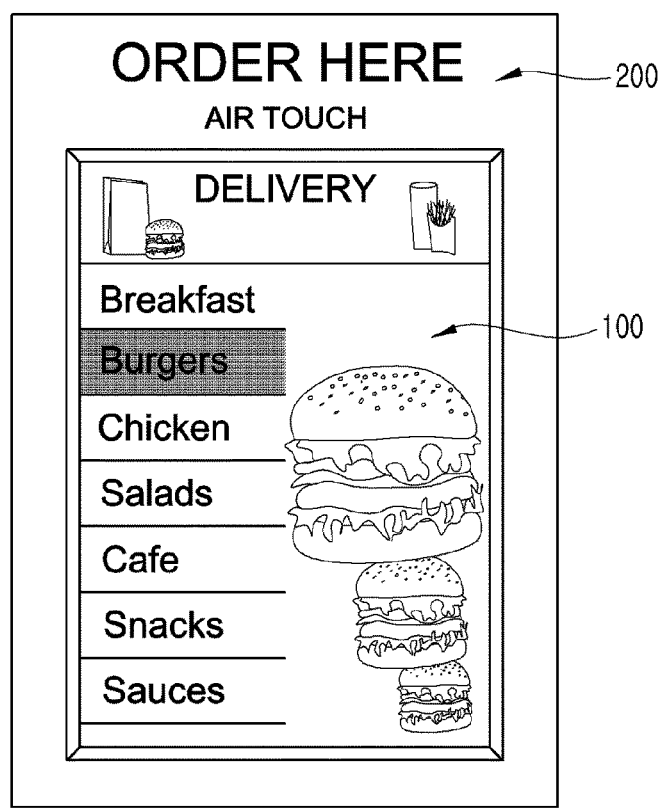
FIG. 1 is a perspective view showing the entire configuration of a non-contact type touch panel system according to an embodiment of the present disclosure.

100: display 110: liquid crystal unit
120: glass unit 121: screen display unit
122: visual display unit 123: sound unit
130: metal frame 150: display unit
170: AD board 190: actuator
200: touch screen 210: sensor unit
211: generator 212: sensor
213: LED assistant 214: speaker
220: touch controller 250: X-axial transmitter
260: X-axial receiver
300: frame 310: frame inclination surface
400: click-informing unit 410: Y-axial transmitter
420: Y-axial receiver
501: first light emitter 502: second light emitter
510: light source 520: discharger
521: blocker 530: diffusion plate
532: installation space 533: diffusion body
534: diffusion extension 540: reflection sheet
550: light guide
600: body casing 610: first rail 620: second rail
650: finishing member 660: coupler
700: touch board 710: transmitter or receiver
800: haptic board 810: speaker
900: light emitter 910: light source casing
911: light source hole 912: sound hole
920: light diffusion cover 921: diffusion base
922: diffusion insert 930: light source
940: light guide plate 950: reflection sheet
960: lighting module
C: PC system

BEST MODE

Hereafter, the present disclosure will be described in detail with reference to the accompanying drawings such that those skilled in the art can easily accomplish the present invention. However, the present disclosure may be modified in various different ways and is not limited to the embodiments described herein.

In the accompanying drawings, portions unrelated to the description will be omitted in order to obviously describe the present invention, and similar reference numerals will be used to describe similar portions throughout the present specification.

The terms and words used in the present specification and claims should not be interpreted as being limited to typical meanings or dictionary definitions, but should be interpreted as having meanings and concepts relevant to the technical scope of the present invention based on the rule according to which an inventor can appropriately define the concept of the term to describe most appropriately the best method he or she knows for carrying out the invention.

Figure 2:
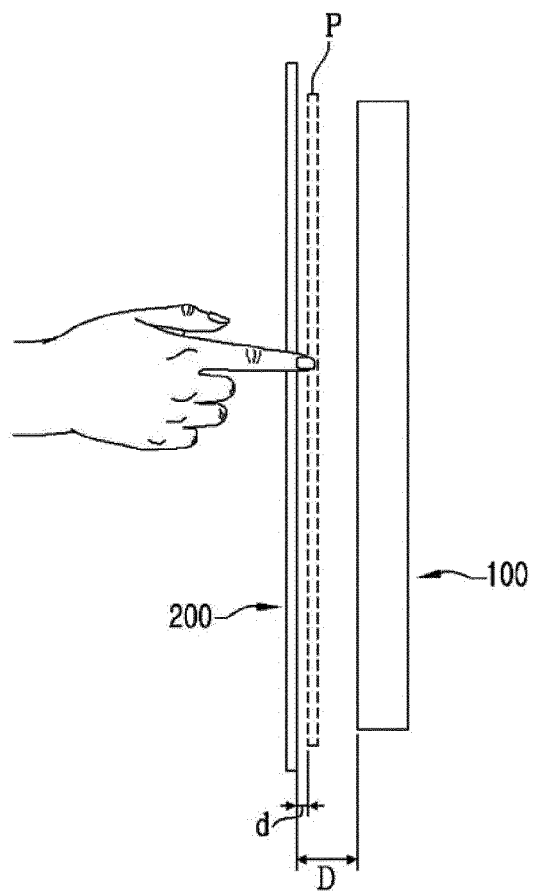
FIG. 2 is a side view schematically showing a non-contact type touch panel system according to an embodiment of the present disclosure.

FIG. 1 is a perspective view showing the entire configuration of a non-contact type touch panel system according to an embodiment of the present disclosure and FIG. 2 is a side view schematically showing a non-contact type touch panel system according to an embodiment of the present disclosure.

As shown in the figures, a non-contact type touch panel system according to the present disclosure includes a display 100 that displays 3D images or videos on a screen and a touch screen 200 that senses the position of input coordinates in a non-contact type.

The display 100, which gives a three-dimensional effect to a user using binocular parallax, projects different images to the left eye and the right eye of a user through a parallax barrier or a lenticular lens attached ahead of the display panel.

The parallax barrier type that is used for the display 100 has vertical slit arrangement and an observer feels a three-dimensional effect by seeing different fixes through the slit arrangement. The lenticular type separate viewpoints by refracting light using a lenticular lens having cylindrical lens arrangement instead of arranging several slits.

The display 100 may be a holography display type or integral holograph (IP) type display that provides 3D videos by combining light fields. Further, the display 100 may be a volumetric display that displays points (voxels) of light in an actual space using a physical structure such as rotation or an air plasma display that shows images in three dimensions using the phenomenon in which air is changed into plasma at a focus where a laser is settled.

The touch screen 200 is disposed ahead of the display 100 and senses the position of input coordinates. In the embodiment shown in the figures, the touch screen 200 is formed in a rectangular ring shape and the center portion where images are display is empty in the display 100.

The touch screen 200, as will be described below, includes a sensor unit 210 composed of several generators 211 and sensors 212. The generators 211 are disposed on a side of the touch screen 200 having a rectangular ring shape and generate infrared rays, ultrasonic waves, etc., and the sensors 212 are disposed on another side of the touch screen 200 to face the generator 211 and sense generated signals.

The generators 211 and the sensors 212 form virtual meshes of infrared rays or ultrasonic waves, and when a user blocks a mesh using a finger, the output at the blocked portion decreases, so it is possible to determine the position of input coordinates.

There may be a predetermined gap D in the front-rear direction between the display 100 and the touch screen 200, so the touch screen 200 may be spaced apart forward from the display 100.

Since a touch screen is attached to a display in the touch screens that are operated in the non-contact type in the related art, a user keeps directly touching the display without recognizing a non-contact touch, so the user is easily exposed to bacterial infection.

However, since the touch screen 200 according to the present disclosure is spaced apart forward from the display 100, the possibility of a user directly touching the display 100 is remarkably reduced and images or pictures that are displayed on the display 100 are 3D images or pictures, so unnatural feeling when touching a space is also decreased.

The gap d in the front-rear direction between the touch screen 200 and a virtual plane P in which 3D images or pictures that are displayed by the display 100 are formed may be 1 to 2 cm.

The reason is that when the gap d in the front-rear direction between the touch screen 20 and the virtual plane P in which 3D images or pictures are formed exceeds 2 cm, a hand of a user comes too deep inside, so there is a high possibility that other portions that are not a (index) finger are recognized and misoperation is generated. When the gap d in the front-rear direction between the touch screen 20 and the virtual plane P in which 3D images or pictures are formed is less than 1 cm, a finger of a user does not sufficiently come inside the touch screen 200 due to the habit of users touching a picture, so there is a high possibility that a touch is not clearly made.

The gap D in the front-rear direction between the display 100 and the touch screen 200 may be about 4 to 6 cm. When the gap D between the display 100 and the touch screen 200 is less than 4 cm, the three-dimensional effect is decreased, and when the gap D between the display 100 and the touch screen 200 exceeds 6 cm, accuracy decreases.

Further, the display 100 and the touch screen 200 may be parallel with each other. This is for increasing accuracy by operating the touch screen 200 maximally in the same direction as the display 100 when a user performs a non-contact touch.

The outermost up, down, left, and right outermost edges of the display may be disposed inside further than the edges of the touch screen 200. That is, the frame of the display 100 is smaller than the frame of the touch screen 200.

Since the display 100 displays 3D images or pictures, objects may seem to be outside the display 100, depending on users. Accordingly, when the size of the touch screen 200 is the same as or smaller than the display 100, there may be an area that cannot be touched (e.g., a corner), so the frame of the touch screen 200 is formed larger than the frame of the display 100 to prevent this problem.

Figure 3:
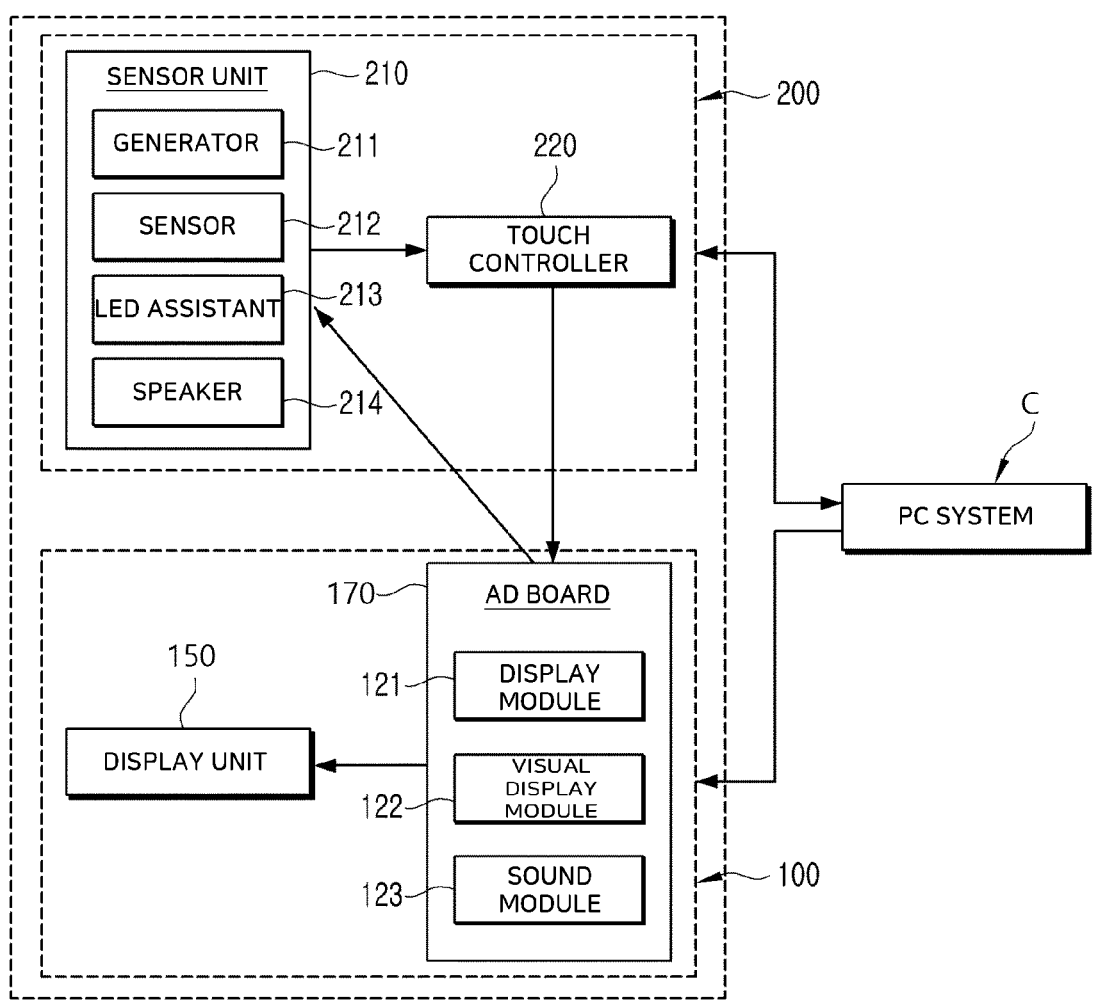
FIG. 3 is a block diagram showing the entire configuration of a non-contact type touch panel system according to an embodiment of the present disclosure.
Figure 4:
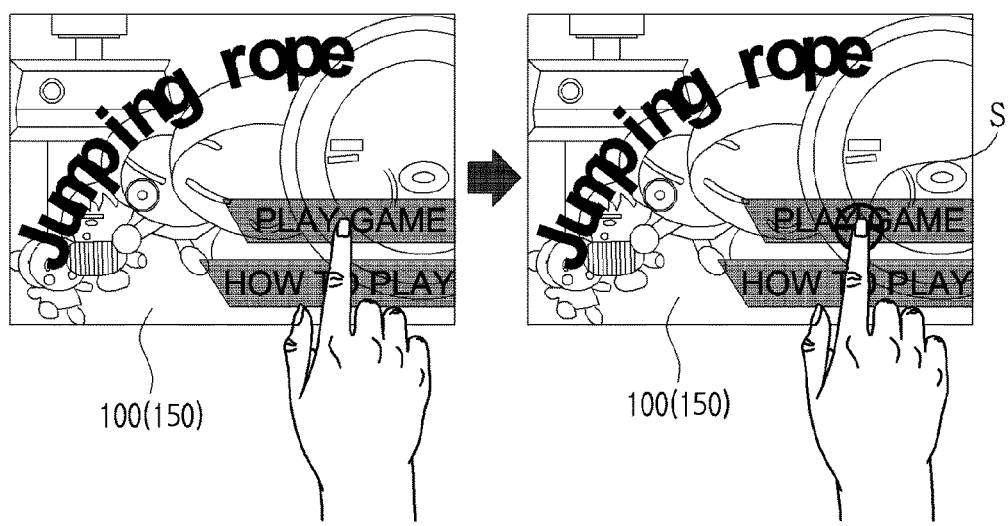
FIG. 4 is an exemplary view showing a touch image display on a display according to an embodiment of the present disclosure.

FIG. 3 is a perspective view showing the entire configuration of a non-contact type touch panel system according to an embodiment of the present disclosure and FIG. 4 is an exemplary view showing a touch image display on a display according to an embodiment of the present disclosure.

As shown in the figures, the non-contact type touch panel system according to the present disclosure includes the display 100 and the touch screen 200, the display 100 includes a display unit 150 and an Analog-to-Digital (AD) board 120, and the touch screen 200 includes a sensor unit 210 and a touch controller 220.

The display unit 150 performs a function of displaying 3D images or pictures such that a user can see them and the AD board 170 is disposed in the display 100 and performs a function of converting an analog signal into a digital signal and designating an RGB value for each pixel.

The sensor unit 210 includes a plurality of generators 211 and sensors 212 and constitutes the frame of the touch screen 200. The touch controller 220 performs a function of converting a touch signal from the sensor unit 210 into input coordinates.

The generators 211 are disposed on a side of the sensor unit 210 and outputs infrared rays, ultrasonic waves, or camera images, and the sensors 212 are disposed on another side of the sensor unit 210 to face the generators 211 and sense signals output from the generators 211.

When a user puts a finger on any one portion of the touch screen 200, the sensor unit 210 recognizes the finger as a touch signal and the touch controller 220 converts the touch signal into X- and Y-coordinate data, whereby the position of the user's finger is calculated.

The input coordinate data are transmitted to a PC system C and software in the PC system C is executed. The software of the PC system C converts a screen signal to the display 100 and the screen of the display 100 is changed.

For example, as shown in FIG. 4, when a user puts a finger close to 'PLAY GAME' displayed on the screen of the display 100, the touch screen 200 recognizes the finger and converts a signal into input coordinates, the software of the PC system C is operated in response to information that the user wants to start a game, and the display 100 receiving the screen signal from the PC system C displays a game screen (not shown).

In the present disclosure, unlike the related art, the AD board 170 of the display 100 is directly connected to the touch controller 220 of the touch screen 200 and directly receives touch signal data and input coordinate data from the touch controller 220.

The AD board 170 may additionally have a display module. The display module 121 receives input coordinate data from the touch controller 220 and controls a predetermined touch symbol S to be output to the display unit 150 on the basis of the input coordinate data.

That is, as shown in FIG. 4, when a user puts a finger close to the touch screen 200 to click a desired point on the display 100, input coordinate data are transmitted to the AD board 170 from the touch controller 220 and the display module 121 of the AD board 170 controlled a predetermined touch symbol S to be displayed on the display unit 150.

The predetermined touch symbol S can be independently displayed by the AD board 170 of the display 100 without help of the PC system C, so there is an advantage that a touch position can be very quickly displayed in comparison to the related art.

The predetermined touch symbol S is shown as a circle in the shown embodiment, but it is not limited thereto and may be replaced with various pictures or indicators.

Therefore, according to the present disclosure, since a user can clearly recognize what point he/she has touched and whether the touch has been clearly input, there is an effect that a direct touch on the display 100 by a user is maximally prevented so that the user is not exposed to bacterial infection.

Figure 5:
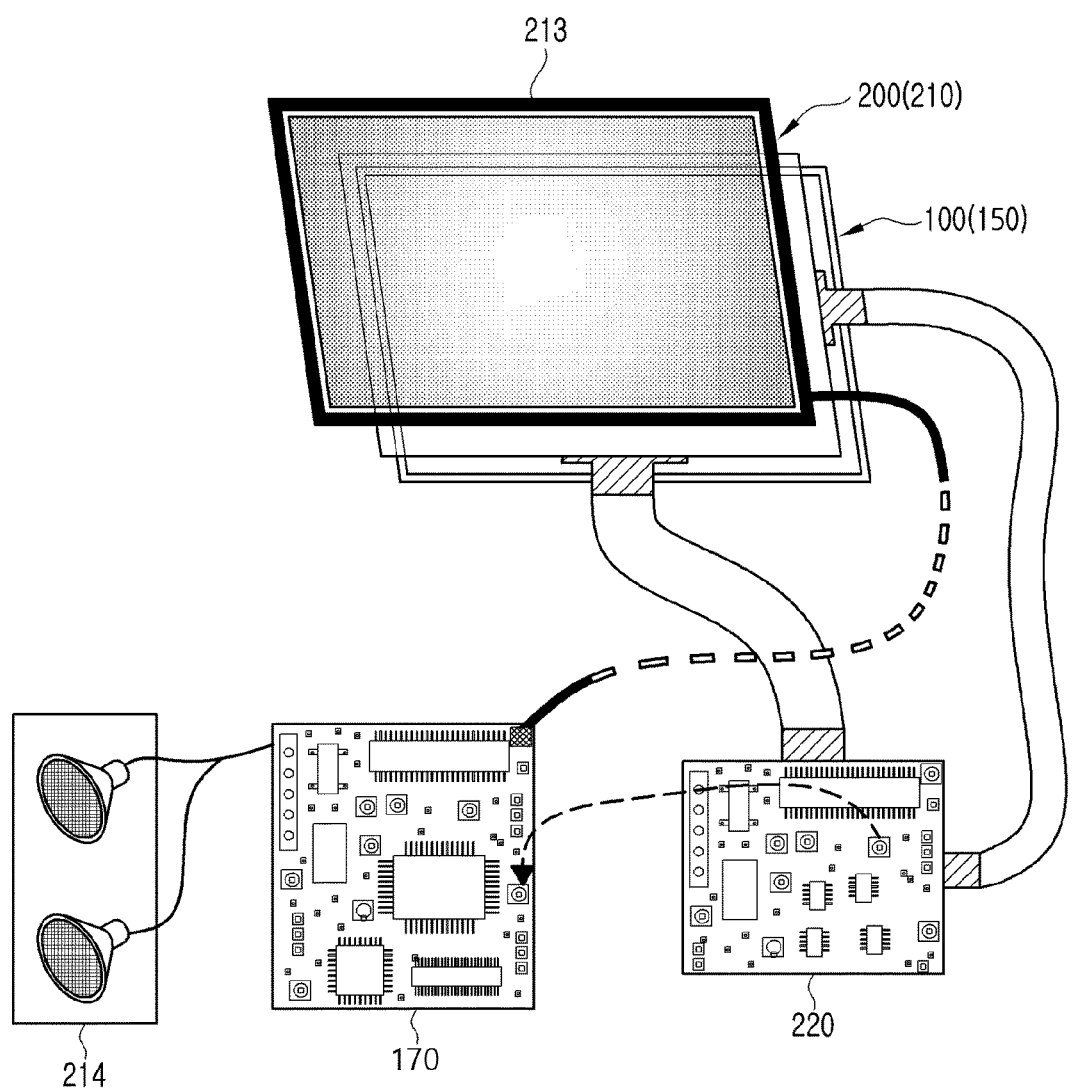
FIG. 5 is a view schematically showing the entire configuration of a non-contact type touch panel system according to another embodiment of the present disclosure.

FIG. 5 is a view schematically showing the entire configuration of the non-contact type touch panel system according to another embodiment of the present disclosure.

As shown in the figure, an LED assistant 213 or a speaker 214 may be additionally coupled to the edge of the sensor unit 210. The LED assistant 213 or the speaker 214 are connected to the AD board 170 and are controlled to emit light or output sound by the AD board 170.

In the shown embodiment, the speaker 214 is connected to the left side of the AD board 170, but this is for easy description and the speaker 214 may also be mounted close to the touch screen 200 similar to the LED assistant 213.

As shown in FIG. 3, the AD board 170 according to the present disclosure includes a visual display module 122 and a sound module 123. The visual display module 122 receives input coordinate data from the touch controller 220 and controls a voltage such that the LED assistant 213 can be operated, and the sound module 123 receives input coordinate data from the touch controller 220 and controls a signal such that the speaker 214 can be operated.

In other words, when a user puts a finger close to the touch screen 200 and a touch signal and input coordinate data are input, a signal corresponding to the input is transmitted from the touch controller 220 to the AD board 170. The AD board 170 controls the LED assistant 213 or the speaker 214 connected to the touch screen 200 so that the user can recognize that the touch is completed.

The light that is emitted from the LED assistant 213 controlled by the visual display module 122 may be shown with various colors, depending on situations. For example, red color may be emitted when any touch signal is not input, and green light may be emitted when a touch signal is input by a user.

The sound that is output from the speaker 214 controlled by the sound module 123 may be any one selected from beep, buzzer, melody, and voice or a combination of two or more thereof.

Figure 6:
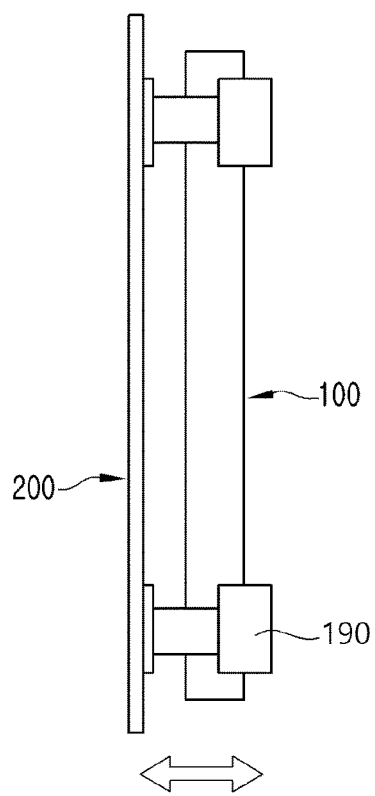
FIG. 6 is a side view schematically showing a non-contact type touch panel system according to another embodiment of the present disclosure.

FIG. 6 is a side view schematically showing a non-contact type touch panel system according to another embodiment of the present disclosure.

As shown in the figured, actuators 190 are further coupled to both sides of the display 100. The actuators 190 are connected at the front ends to the touch screen 200 and move the touch screen 220 forward and backward.

That is, the gap D between the display 100 and the touch screen 200 is freely adjusted by the operation of the actuators 190.

The gap D between the display 100 and the touch screen 200 which is adjusted by the actuators 190 may be 4 to 6 cm, but should not exceed 10 cm.

This is because when the gap D between the display 100 and the touch screen 200 is less than 4 cm, the three-dimensional effect of the display 100 decreases, and when the gap D between the display 100 and the touch screen 200 exceeds 6 cm, the touch operation accuracy of the touch screen decreases.

The touch screen 200 may be moved backward by the actuators 190 to come in close contact with the front surface of the display 100. When the touch screen 200 comes in close contact with the display 100, the display outputs a 2D picture or image on the screen.

The display 100 can be switched to output a 3D picture and a 2D picture by turning on/off the lenticular lens attached ahead of the display panel. The lenticular lens is a lens using liquid crystals and can be turned on/off by changing an effective refractive index of light by applying an appropriate voltage.

A user selects whether to output a 3D picture or a 2D picture through the display 100 by pressing a separate button, etc. When a user selects transmission of a 3D picture, the actuators 190 move the touch screen 200 away from the display 100 close to the virtual plane in which a 3D image or picture are formed. When the user selects transmission of a 2D picture, the actuators 190 bring the touch screen 200 in close contact with the display 100.

Hereafter, a method of controlling a non-contact type touch panel system according to the present disclosure is described.

Figure 7:
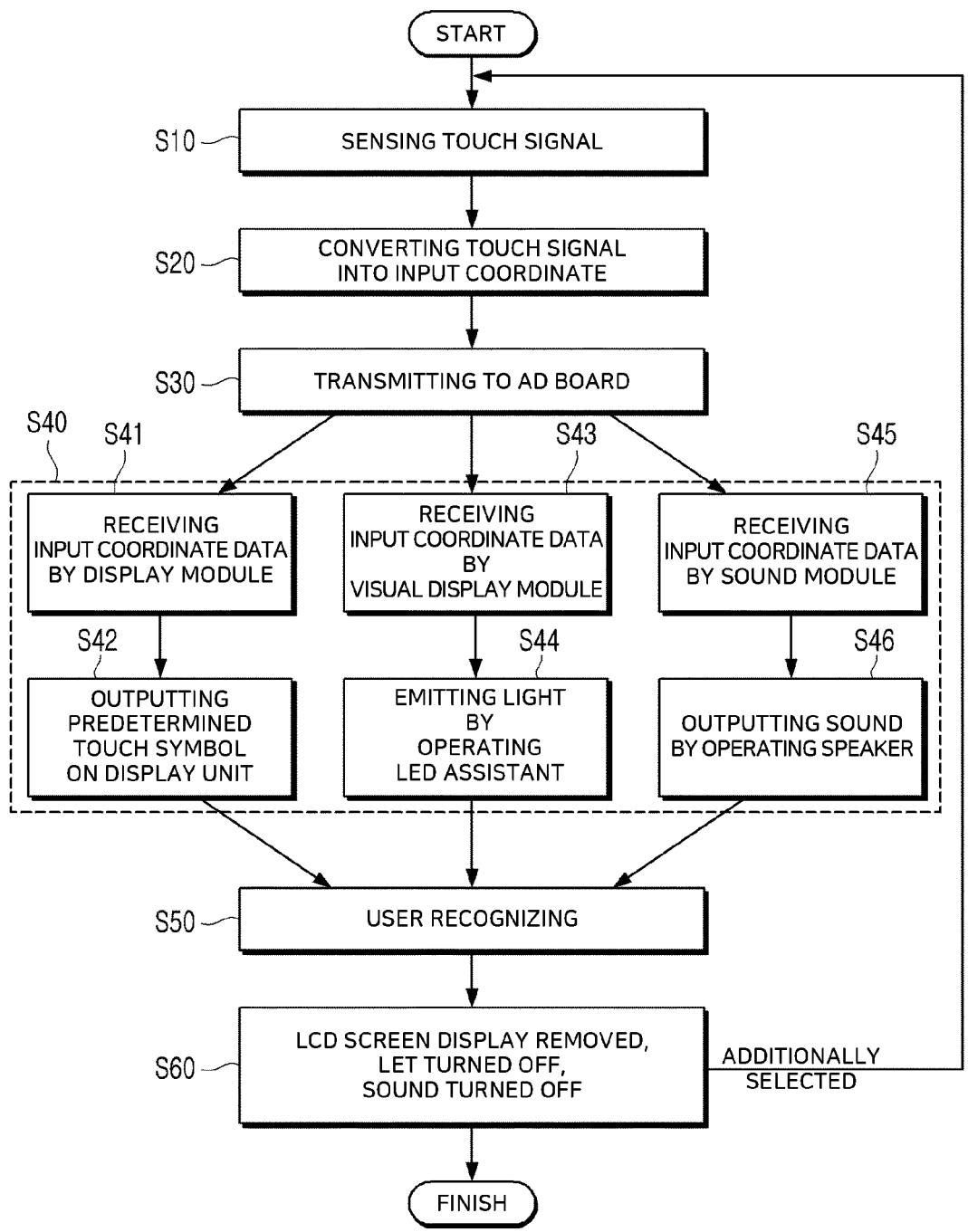
FIG. 7 is a flowchart of a method of controlling a non-contact type touch panel system according to an embodiment of the present disclosure.

FIG. 7 is a flowchart of a method of controlling a non-contact type touch panel system according to an embodiment of the present disclosure.

As shown in FIG. 7, first, when a user puts a finger close to the touch screen 200 formed in a rectangular ring shape, the sensing amount between the generators 211 and the sensors 212 decreases, so a touch signal is sensed (S10).

When the touch signal is sensed, the touch controller 220 of the touch screen 200 converts the touch signal into X- and Y-input coordinates through calculation and calculates the point that the user wants to touch (S20).

The touch signal data and the input coordinate data of the touch controller 220 are transmitted to the AD board 170 of the display 100 (S30). Obviously, the touch signal data and the input coordinate data of the touch controller 220 are also transmitted to the PC system C such that driving software is executed.

The AD board 170 may be directly connected to the touch controller 220 and may directly receive touch signal data and input coordinate data.

When the touch signal data and input coordinate data are transmitted to the AD board 170, a user-informing module of the AD board 170 is operated (S40). The user-informing module is a module including the display module 121, the visual display module 122, and the sound module 123.

The step in which the user-informing module is operated (S40) may include a step in which input coordinate data are transmitted from the touch controller 220 to the display module 121 of the AD board 170 (S41) and a step in which a predetermine touch symbol is output through the display unit 150 of the display 140 by the display module 121 (S42).

That is, the touch signal data and the input coordinate data transmitted from the touch controller 220 are transmitted to the display module 121 and the display module 121 outputs a predetermined touch symbol S through the display unit 150 of the display 100 so that the user can recognize the touch (S50).

The step in which the user-informing module is operated (S40) may include a step in which input coordinate data are received to the visual display module 122 of the AD board 170 from the touch controller 220 (S43) and a step in which the LED assistant 213 coupled to the touch screen 200 is operated by the visual display module 122 to emit light (S44).

The touch signal data and the input coordinate data transmitted from the touch controller 220 are transmitted to the visual display module 122 and the visual display module 122 controls the LED assistant 213 coupled to the touch screen 200 to emit light so that the user can recognize the touch (S50).

The step in which the user-informing module is operated (S40) may include a step in which input coordinate data is received to the sound module 123 of the AD board 170 from the touch controller 220 (S45) and a step in which the speaker 214 coupled to the touch screen 200 is operated by the sound module 123 to output a sound (S46).

The touch signal data and the input coordinate data transmitted from the touch controller 220 are transmitted to the sound module 123 and the sound module 123 controls the speaker 214 coupled to the touch screen 200 to output a sound so that the user can recognize the touch (S50). After informing the touch signal to the user, the light may be removed and the sound may be turned off and the user may additionally select an item (S60).

As described above, since the visual/aural recognition ability is improved by the display module 121, the visual display module 122, and the speaker 214, it is possible to easily determine whether there is a touch, so it is possible to easily induce a non-contact touch from a user. When there is a touch, the AD board 170 directly connected to the display 100 can output a touch symbol, light, or a sound, so a user can quickly recognize the touch with less delay.

Further, the present disclosure provides a non-contact type touch panel display structure that can maximally prevent a touch by the user's body when the user inputs information to a touch panel by disposing a touch screen at a predetermined distance from the outer edges of a display.

Figure 8:
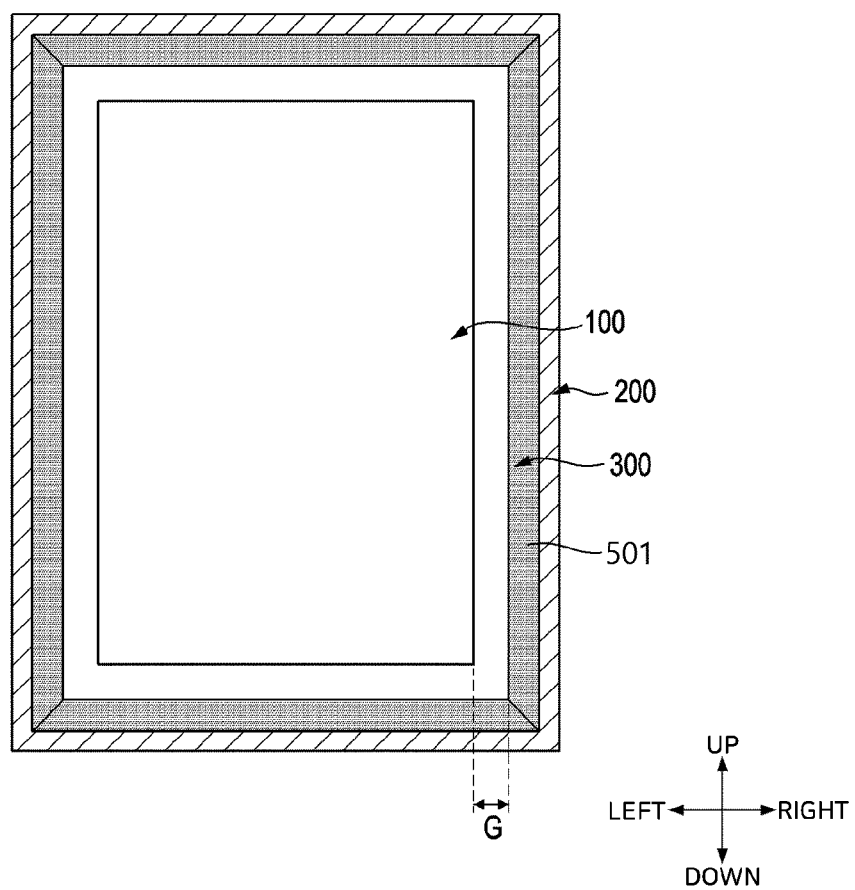
FIG. 8 is a view showing the front of a non-contact touch panel display structure according to an embodiment of the present disclosure.
Figure 9:
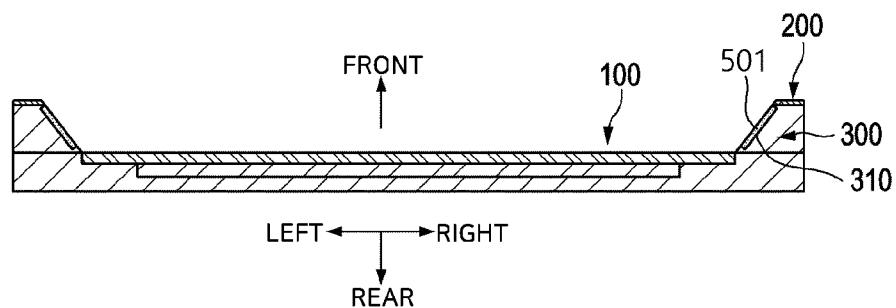
FIG. 9 is a horizontal cross-sectional view of the non-contact touch panel display according to an embodiment of the present disclosure.

FIG. 8 is a view showing the front of a non-contact touch panel display structure according to an embodiment of the present disclosure and FIG. 9 is a horizontal cross-sectional view of the non-contact touch panel display structure having a click recognition function of the present disclosure.

As shown in the figures, a non-contact touch panel display structure according to an embodiment of the present disclosure includes a display 100, a touch screen 200, and a frame 300.

The display 100 displays images or pictures that a user wants on a screen. The touch screen 200 senses the position of input coordinates touched by a user in a non-contact type.

The touch screen 200 is disposed over the front surface of the display 100 around the display 100. That is, the touch screen 200 is entirely disposed in a rectangular ring shape and is empty at the center portion corresponding to the screen of the display 100.

The touch screen 200 includes several generator and sensors. The generators are disposed on a side of the touch screen 200 and generate infrared rays, ultrasonic waves, etc., and the sensors disposed on another side of the touch screen 200 to face the generators and sense generated signals.

The generators and the sensors form virtual meshes of infrared rays or ultrasonic waves, and when a user blocks a mesh using a finger, the output at the blocked portion decreases, so it is possible to determine the position of input coordinates.

The touch screen 200 is spaced apart forward from the display such that a predetermined gap D is formed in the front-rear direction between the display 100 and the touch screen 200.

The display 100 can display 3D images or pictures on the screen. When the display 100 displays a 3D picture, so unnatural feeling when a user touches a space is remarkably decreased.

The front-rear gap between the display 100 and the touch screen 200 may be limited within 1 to 3 cm. The reason is that when the gap in the front-rear direction between the display 100 and the touch screen 200 exceeds 3 cm, a hand of a user comes too deep inside, so there is a high possibility that other portions that are not a (index) finger are recognized and misoperation is generated. Further, when the gap in the front-rear direction between the display 100 and the touch screen 200 is less than 1 cm, a user's finger touches the display 100 due to the habit of users touching a picture, so it is difficult to sufficiently use the function of the non-contact type.

The display 100 and the touch screen 200 are connected though the frame 300. That is, as shown in FIG. 9, the frame 300 is coupled to the edges of the display 100 and the touch screen 200 is coupled to the top of the frame 300.

The touch screen 200 is spaced apart outward from the upper, lower, left, and right outer edges of the display 100, so a predetermined gap G may be formed between the edges of the display 100 and the touch screen 200.

In other words, the touch screen 200 is spaced obliquely forward and apart outward from the edges of the display 100 rather than being perpendicularly spaced apart forward from the edges of the display 100.

This is because when the touch screen 200 is perpendicularly spaced forward from the edges of the display 100, a user has difficulty to touch a picture or an image displayed close to the edges of the display 100 and the accuracy of touching decreases, and the possibility that some of fingers folded when touching come in contact with the touch screen 200 increases.

When the touch screen 200 is spaced obliquely forward and outward from the edges of the display 100, sufficient spaces are formed close to the edges of the display 100, so it is easy to touch a picture or an image close to the edges. Further, the possibility that some of fingers folded when touching come in contact with the touch screen 200 decreases.

The predetermined gap G between the edges of the display 100 and the touch screen 200 may be about 1 to 2 cm. When the gap G between the edges of the display 100 and the touch screen 200 is less than 1 cm, the gap is thinner than common fingers, so the touch effect or non-contact effect is deteriorated. When the gap G between the display 100 and the touch screen 200 exceeds 2 cm, the outer casing of the product becomes excessively large.

The display 100 and the touch screen 200 may be disposed in parallel with each other. This is for increasing accuracy by operating the touch screen 200 maximally in the same direction as the display 100 when a user performs a non-contact touch.

As shown in FIG. 9, the frame 300 has frame inclination surfaces 310 inclined downward at a predetermined angle toward the display 100 from the touch screen 200.

Since the touch screen 200 is disposed at a predetermined height from the display 100, when a non-contact is applied, a large depth feeling is generated and visual concentration is low, but the frame 300 having the frame inclination surfaces 310 can solve this problem.

That is, the frame 300 is not perpendicularly recessed from the touch screen 200 to the display 100, but the frame inclination surfaces 310 are naturally elongated to the display, so a user can conveniently perform a touch.

Meanwhile, a first light emitting unit 501 may be further connected to the frame inclination surface 310. The first light emitting unit 501 emits light when a touch by a user is sensed by the touch screen 200 so that the user can visually recognize that the touch is completed.

The first light emitting unit 501 may be formed to be able to cover the frame inclination surfaces 310 and is disposed in parallel with the longitudinal direction of the touch screen 200.

The first light emitting unit 501 may be disposed at four positions around the display 100, may be disposed at only two positions over and under or left and right side of the display 100, or may be disposed only at any one side, that is, may be disposed in various ways, depending on situations.

When a user puts a finger close to the touch screen 200 to click a desired position on the display 100, a touch signal and input coordinate data are transmitted from the touch module and the first light emitting unit 501 is operated in response to the signal so that the user can recognize that the touch is completed. The first light emitting unit 501 emits light with a color corresponding to the signal.

Figure 10:
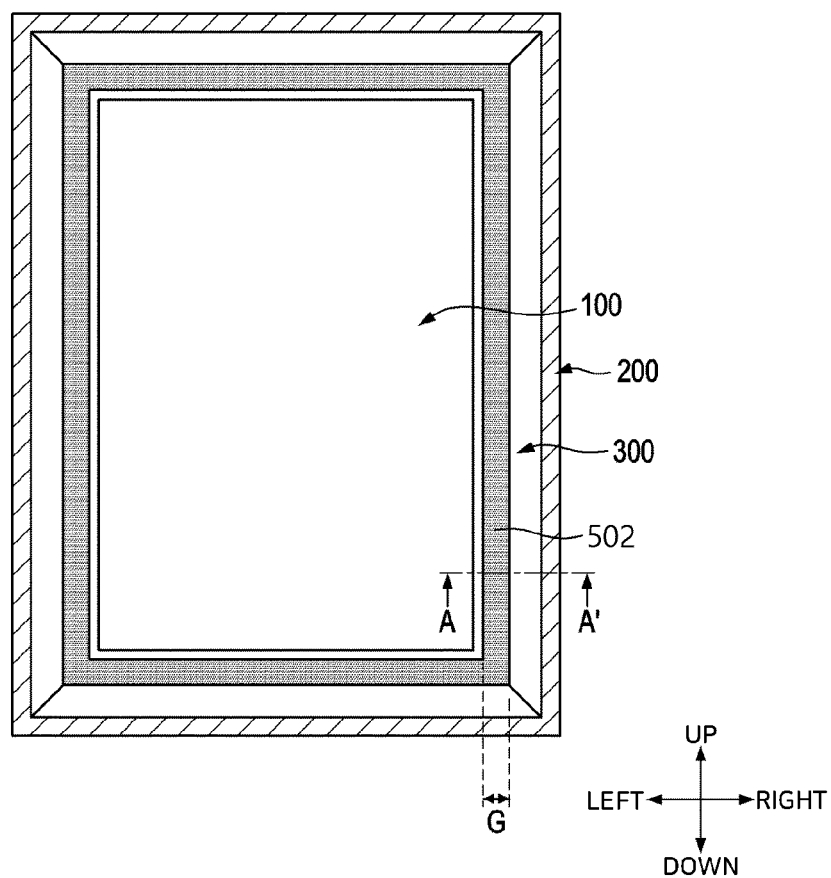
FIG. 10 is a view showing the front of a non-contact touch panel display structure according to a second embodiment of the present disclosure.
Figure 11:
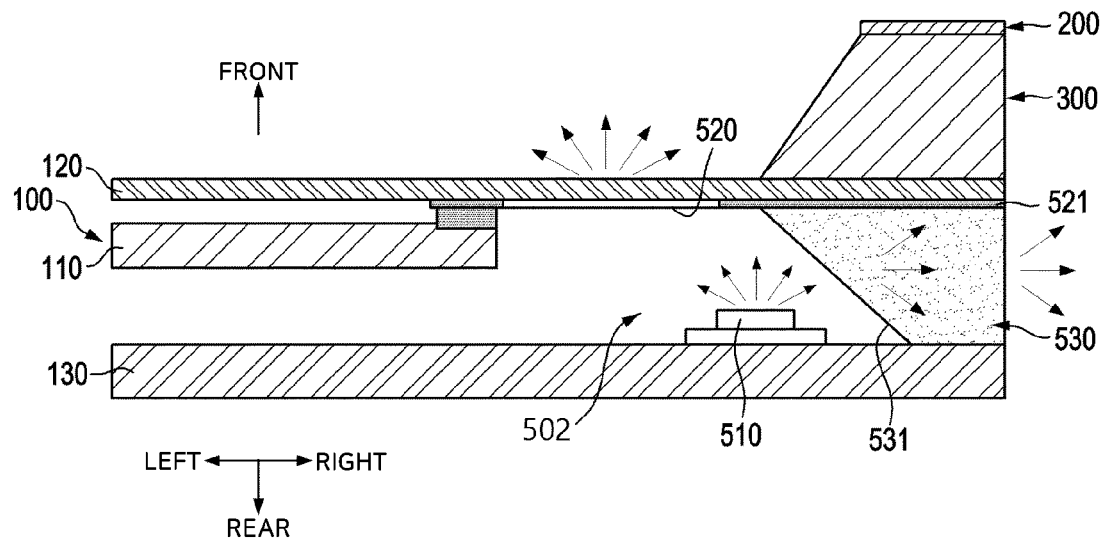
FIG. 11 is a view schematically showing a cross-section of a second light emitter taken along line A-A' shown in FIG. 10.

FIG. 10 is a view showing the front of a non-contact touch panel display structure according to a second embodiment of the present disclosure and FIG. 11 is a view schematically showing a cross-section of a second light emitting unit taken along line A-A' shown in FIG. 10.

As shown in the figures, in the second embodiment of the present disclosure, a second light emitting unit 502 may be further mounted in the space G between the display 100 and the touch screen 200.

The second light emitting unit 502, similar to the first light emitting unit 501, emits light when a touch by a user is sensed by the touch screen 300 so that the user can easily visually recognize that the touch is completed.

The first light emitting unit 501 and the second light emitting unit 502 may be installed separately or together, depending on situations, or the first light emitting unit 100 may be disposed at a side of the display 100 and the second light emitting unit 502 may be disposed at another side, that is, they may be disposed in various ways.

The second light emitting unit 502 is formed to be able to cover a portion of the front surface of the display 100 and is disposed in parallel with the longitudinal direction of the touch screen 200.

The second light emitting unit 502 may be disposed at four positions around the display 100, may be disposed at only two positions over and under or left and right side of the display 100, or may be disposed only at any one side, that is, may be disposed in various ways, depending on situations.

The display 100 includes a liquid crystal unit 110 providing a display screen and a glass unit 120 disposed ahead of the liquid crystal unit. The pictures or images displayed on the display screen of the liquid crystal unit 110 are shown to the outside through the glass unit 120.

The glass unit 120 may extend outward further than the upper, lower, left, and right outer edges of the liquid crystal unit 110. That is, when the glass unit 120 overlaps the liquid crystal unit 110, the glass unit 120 is relatively larger than the liquid crystal unit 110.

As shown in FIG. 11, the second light emitter 502 according to the second embodiment of the present disclosure includes a light source 510, a discharger 520, and a diffusion plate 530.

The light source 510 is disposed at a side behind the glass unit 120 and radiates light forward. For example, the light source 510 may be coupled to a metal frame 130 disposed behind the glass unit 120 and may radiate light toward the glass unit 120.

When a user puts a finger close to the touch screen 200 to click a desired position on the display 100, a touch signal and input coordinate data are transmitted from the touch module and the light source 510 is operated in response to the signal.

The discharger 520 is attached to the rear surface of the glass unit 120 outside the liquid crystal unit 110 and transmits the light radiated from the light source 510 such that the light can be discharged forward from the glass unit 120.

The discharger 520 may be made of a transparent material or a translucent material to be able to transmit the light radiated from the light source 510. The light radiated from the light source 510 travels outside through the discharger 520 and the glass unit 120.

A blocker 521 that blocks the light radiated from the light source 510 is attached to the rear surface of the glass unit 120 outside the discharger 520. The blocker 521 may be made of an opaque material.

The blocker 521 prevents the light radiated from the light source 510 from being discharged to areas excepting the discharger 520, thereby improving a touch recognition ability of a user.

The diffusion plate 530 may be further coupled behind the glass unit 120. The diffusion plate 530 is disposed relatively outside and transmits the light radiated from the light source 510 such that the light can be discharged out of the display 100.

The inner surface of the diffusion plate 530 is a diffusion inclination surface 531 formed at an acute angle with respect to the glass unit 120 and the outer surface of the diffusion plate 530 is perpendicular to the glass unit 120. That is, the diffusion plate 530 entirely has a right trapezoidal cross-section.

A portion of the light radiated from the light source 510 hits against the diffusion inclination surface 531 to be reflected into the diffusion plate 530 and is then discharged out of the diffusion plate 530.

In other words, a portion of the light radiated from the light source 510 is discharged forward from the glass unit 120 through the discharger 520 and the other of the light radiated from the light source 510 is discharged out of the diffusion plate 530 through the diffusion plate 530.

As described above, according to the present disclosure, the light radiated from one light source 510 can travel to both of the discharger 520 and the diffusion plate 530, so a user can easily recognize whether a touch is completed and other people standing around can easily recognize whether the product is used.

The diffusion plate 530 may also be made of a transparent material or a translucent material. Further, a user can set low brightness for the light discharged from the discharger 520 to prevent dazzling by making the transparency of the discharger 520 and the diffusion plate 530 different and can set high brightness for the light discharged from the diffusion plate 530 to make the light be more easily recognized.

Figure 12:
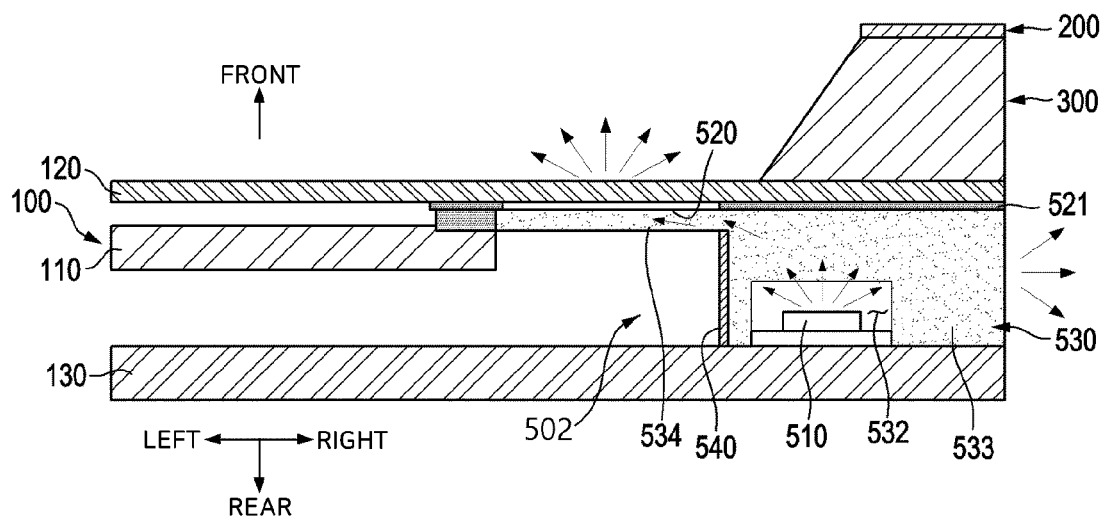
FIG. 12 is a view schematically showing a cross-section of a second light emitter according to a third embodiment of the present disclosure.

FIG. 12 is a view schematically showing a cross-section of a second light emitter according to a third embodiment of the present disclosure.

Similar to the second light emitter according to the second embodiment of the present disclosure described above, a second light emitter 502 according to the third embodiment may also be mounted in the space G between the display 100 and the touch screen 200.

The second light emitter 502 emits light when a touch by a user is sensed by the touch screen 200 so that the user can visually recognize that the touch is completed.

As shown in FIG. 12, the second light emitter 502 according to the third embodiment of the present disclosure includes a light source 510, a discharger 520, a diffusion plate 530, and a reflection sheet 540.

The diffusion plate 530 is attached to the rear surface of the glass unit 120 and has a predetermined installation space 532 therein. The diffusion plate 530 includes a diffusion body 533 having the installation space 532 therein and has a rectangular cross-section and a diffusion extension 534 horizontally extending from the inner side of the upper end.

In other words, the diffusion plate 530 entirely has an inverse L-shaped cross-section and has the predetermined space 532 therein. A portion of light radiated from the light source 510 and travels through the diffusion plate 530 may be discharged forward from the diffusion extension 534 and the other of the light may be discharged out of the diffusion body 533.

The light source 510 is disposed in the installation space 532 of the diffusion plate 530 and radiates light forward. For example, the light source 510 may be coupled to a metal frame 130 disposed behind the glass unit 120 and may radiate light toward the diffusion plate 530 and the glass unit 120.

When a user puts a finger close to the touch screen 200 to click a desired position on the display 100, a touch signal and input coordinate data are transmitted from the touch module and the light source 510 is operated in response to the signal.

The discharger 520 is attached to the rear surface of the glass unit 120 outside the liquid crystal unit 110 and is disposed between the glass unit 120 and the diffusion extension 534 of the diffusion plate 530. The light radiated from the light source 510 and travels through the diffusion plate 530 is discharged forward from the glass unit 120 through the discharger 520.

The discharger 520 may be made of a transparent material or a translucent material to be able to transmit the light radiated from the light source 510. The light radiated from the light source 510 travels outside through the diffusion plate 530, the discharger 520, and the glass unit 120.

A blocker 521 that blocks the light radiated from the light source 510 is attached to the rear surface of the glass unit 120 outside the discharger 520. The blocker 521 may be made of an opaque material.

The blocker 521 prevents the light radiated from the light source 510 from being discharged to areas excepting the discharger 520, thereby improving a touch recognition ability of a user.

The reflection sheet 540 is attached to the inner surface of the diffusion body 533 of the diffusion plate 530. The reflection sheet 540 reflects outward a portion of the light radiated inward from the light source 510, thereby increasing the amount of light that is discharged out of the display 100 and preventing the light radiated from the light source 510 from influencing the liquid crystal unit 110.

A portion of the light radiated from the light source 510 travels through the diffusion plate 530 and is discharged forward through the discharger 520 and the other of the light radiated from the light source 510 is discharged out of the diffusion plate 530 through the diffusion plate 530.

As described above, according to the present disclosure, the light radiated from one light source 510 can be simultaneously discharged forward from the discharger 520 and out of the diffusion plate 530, so a user can easily recognize whether a touch is completed and other people standing around can easily recognize whether the product is used.

Figure 13:
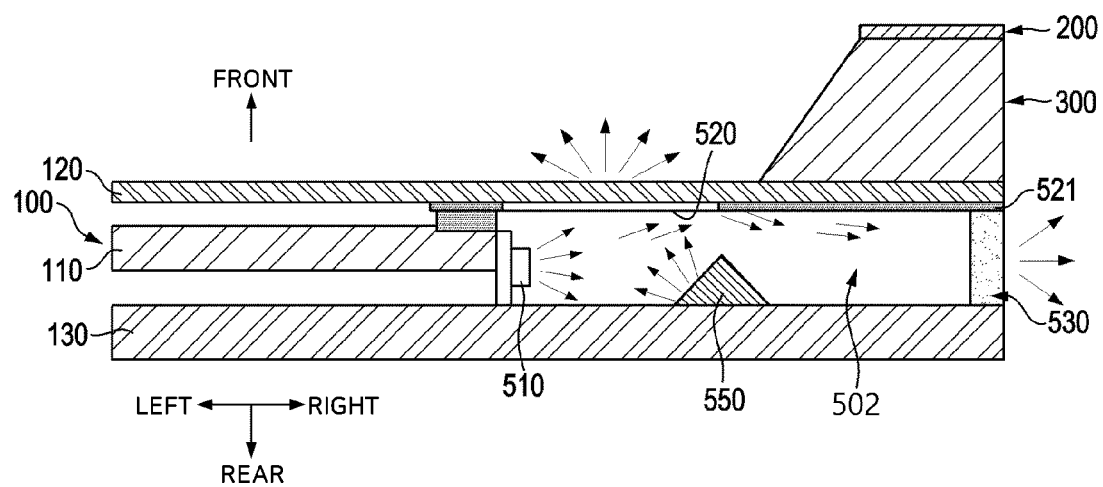
FIG. 13 is a view schematically showing a cross-section of a second light emitter according to a fourth embodiment of the present disclosure.

FIG. 13 is a view schematically showing a cross-section of a second light emitter according to a fourth embodiment of the present disclosure.

Similar to the second light emitters according to the second embodiment and third embodiment of the present disclosure, a second light emitter 502 according to the fourth embodiment may also be mounted in the space G between the display 100 and the touch screen 200.

As shown in FIG. 13, the second light emitter 502 according to the third embodiment of the present disclosure includes a light source 510, a discharger 520, a diffusion plate 530, and a light guide 550.

Unlike the light sources according to the second embodiment and the third embodiment of the present disclosure, the light source 510 according to the fourth embodiment of the present disclosure is coupled to an outer end of the liquid crystal unit 110 and radiates light to the outside.

When a user puts a finger close to the touch screen 200 to click a desired position on the display 100, a touch signal and input coordinate data are transmitted from the touch module and the light source 510 is operated in response to the signal.

A portion of the light radiated from the light source 510 is reflected by the light guide 550, so the light travels forward. The light guide 550 is disposed at a side behind the glass unit 120 and outside further than the light source 510.

The light guide 550 has a triangular cross-section and is spaced a predetermined gap from behind the glass unit 120. A portion of the light radiated from the light source 510 is reflected by the light guide 550, so the light travels forward. And the other of the light radiated from the light source 510 is discharged out through the space between the light guide 550 and the glass unit 120.

The discharger 520 is attached to the rear surface of the glass unit 120 outside the liquid crystal unit 110 and transmits the light radiated from the light source 510 such that the light can be discharged from the glass unit 120.

The discharger 520 may be made of a transparent material or a translucent material to be able to transmit the light radiated from the light source 510. The light radiated from the light source 510 is reflected by the light guide 550 and then travels outside through the discharger 520 and the glass unit 120.

A blocker 521 that blocks the light radiated from the light source 510 is attached to the rear surface of the glass unit 120 outside the discharger 520.

The blocker 521 may be made of an opaque material.

The blocker 521 prevents the light radiated from the light source 510 from being discharged to areas excepting the discharger 520, thereby improving a touch recognition ability of a user.

The diffusion plate 530 may be further coupled to the outer end of the rear surface of the glass unit 120. The diffusion plate 530 transmits the light radiated from the light source 510 such that the light can be discharged out of the display 100.

In other words, in the light radiated from the light source 510, the other light not reflected by the light guide 550 can be discharged out of the display 100 through the diffusion plate 530.

The light source 510, the light guide 550, and the diffusion plate 530 may be disposed at the same height in line in the order of light source 510—light guide-550—diffusion plate 530 outside the liquid crystal unit 110.

Since the light source 510 is disposed to radiate light forward in the second embodiment and the third embodiment of the present disclosure described above, a space for mounting other parts such as the diffusion plate 530 is additionally required between the glass unit 120 and the light source 510. However, the light source 510 according to the fourth embodiment of the present disclosure is disposed to radiate light to the outside and the light guide 550 and the diffusion plate 530 are disposed in parallel with the light source 510, so there is a difference from the second and third embodiments that a slimmer design can be achieved.

In other words, the width in the front-rear direction between the glass unit 120 and the metal frame 130 may be smaller than the width in the front-rear direction between the glass unit 120 and the metal frame 130 in the second embodiment or the third embodiment of the present disclosure.

Further, as described above, according to the present disclosure, there is the advantage that the light radiated from one light source 510 can travel to both of the discharger 520 and the diffusion plate 530, so a user can easily recognize whether a touch is completed and other people standing around can easily recognize whether the product is used.

The diffusion plate 530 may also be made of a transparent material or a translucent material. Further, a user can set low brightness for the light discharged from the discharger 520 to prevent dazzling by making the transparency of the discharger 520 and the diffusion plate 530 different and can set high brightness for the light discharged from the diffusion plate 530 to make the light be more easily recognized.

It may be possible to apply an additional function that can visually or aurally inform a user whether a click is completed to the non-contact touch panel display structure of the present disclosure.

Figure 14:
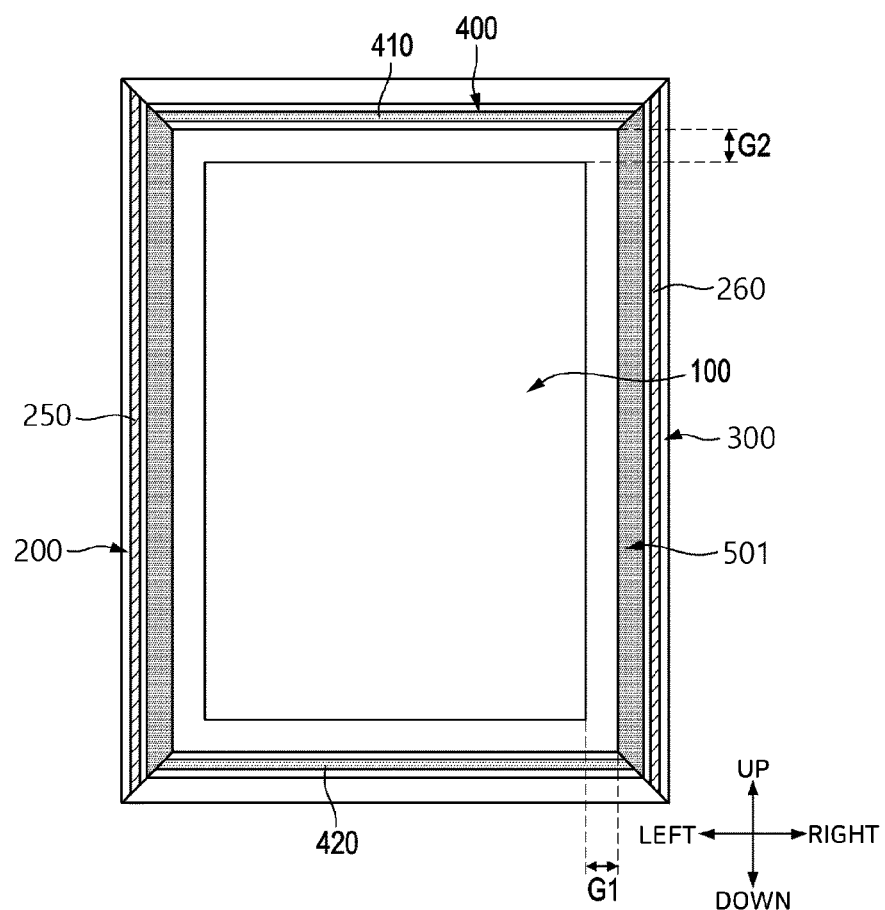
Figure 15:
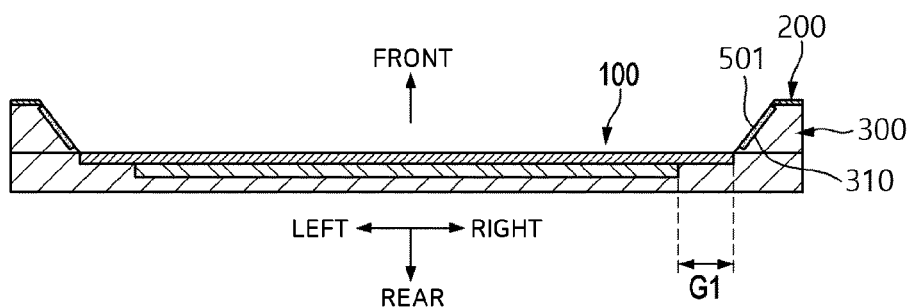

FIG. 14 is a view showing the front of a non-contact touch panel display structure according to a fifth embodiment of the present disclosure and FIG. 15 is a horizontal cross-sectional view of a click-informing non-contact touch panel display structure according to the fifth embodiment of the present disclosure.

As shown in FIGS. 14 and 15, the non-contact touch panel display structure having a click-informing function according to the fifth embodiment of the present disclosure includes a display 100, a frame 300, a touch screen 200, and a click-informing unit 400.

The display 100 displays images or pictures that a user wants on a screen. The frame 300 is mounted on the front surface of the display 100 and has a predetermined height.

The frame 300 is on the front surface of the display 100 around the display 100. That is, the frame 300 is entirely disposed in a rectangular ring shape to surround the display 100 and is empty at the center portion corresponding to the screen of the display 100.

The touch screen 200 senses the position of input coordinates touched by a user in a non-contact type. The touch screen 200 is coupled to the frame 300 at the left and right sides of the display 100.

The touch screen 200 has several X-axial transmitters 250 and X-axial receivers 260. In the shown embodiment, the X-axial transmitters 250 is disposed on the frame 300 at the left side of the display 100 and the X-axial receivers 260 are disposed on the frame 300 at the right side of the display 100 to face the X-axial transmitters 250.

The X-axial transmitters 250 generate infrared rays, ultrasonic waves, etc., and the X-axial receivers 260 receive generated signals. The X-axial transmitters 250 and the X-axial receivers 260 form virtual infrared or ultrasonic lines, and when a user blocks a line using a finger, output decreases at the blocked portion, so it is possible to determine the position of input coordinates.

A predetermined gap T1 is defined in the front-rear direction as high as the frame 300 between the display 100 and the touch screen 200, so the touch screen 200 is spaced apart forward from the display 100. As shown in FIG. 15, the touch screen 200 is coupled to the front end of the frame 300.

The touch screen 200 is spaced apart outward from the left and right outer edges of the display 100, so a predetermined gap G1 may be formed in the left-right direction between the edges of the display 100 and the touch screen 200.

In other words, the touch screen 200 is obliquely spaced forward and apart outward from the edges of the display 100 rather than being perpendicularly spaced apart forward from the edges of the display 100.

This is because when the touch screen 200 is perpendicularly spaced forward from the edges of the display 100, a user has difficult to touch a picture or an image displayed close to the edges of the display 100 and the accuracy of touching decreases, and the possibility that some of fingers folded when touching come in contact with the touch screen 200 increases.

When the touch screen 200 is spaced obliquely forward and outward from the edges of the display 100, sufficient spaces are formed close to the edges of the display 100, so it is easy to touch a picture or an image close to the edges. Further, the possibility that some of fingers folded when touching come in contact with the touch screen 200 decreases.

The predetermined gap G1 in the left-right direction between the edges of the display 100 and the touch screen 200 may be about 1 to 2 cm. When the gap G1 between the display 100 and the touch screen 200 is less than 1 cm, the gap is thinner than common fingers, so the touch effect or non-contact effect is deteriorated. When the gap G1 between the display 100 and the touch screen 200 exceeds 2 cm, the outer casing of the product becomes excessively large.

Further, the display 100 and the touch screen 200 may be parallel with each other. This is for increasing accuracy by operating the touch screen 200 maximally in the same direction as the display 100 when a user performs a non-contact touch.

Meanwhile, as shown in FIG. 15, the frame 300 has frame inclination surfaces 310 inclined downward at a predetermined angle toward the display 100 from the touch screen 200.

Since the touch screen 200 is disposed at a predetermined height from the display 100, when a non-contact is applied, a large depth feeling is generated and visual concentration is low, but the frame 300 having the frame inclination surfaces 310 can solve this problem.

That is, the frame 300 is not perpendicularly recessed from the touch screen 200 to the display 100, but the frame inclination surfaces 310 are naturally elongated to the display, so a user can conveniently perform a touch.

Meanwhile, a first light emitter 501 may be further connected to the frame inclination surface 310.

Figure 16:
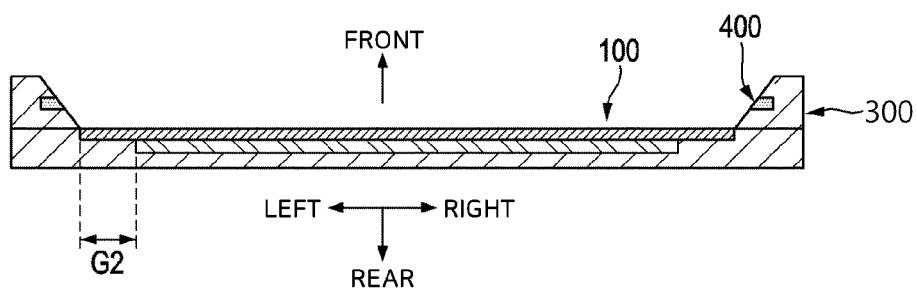
Figure 17:
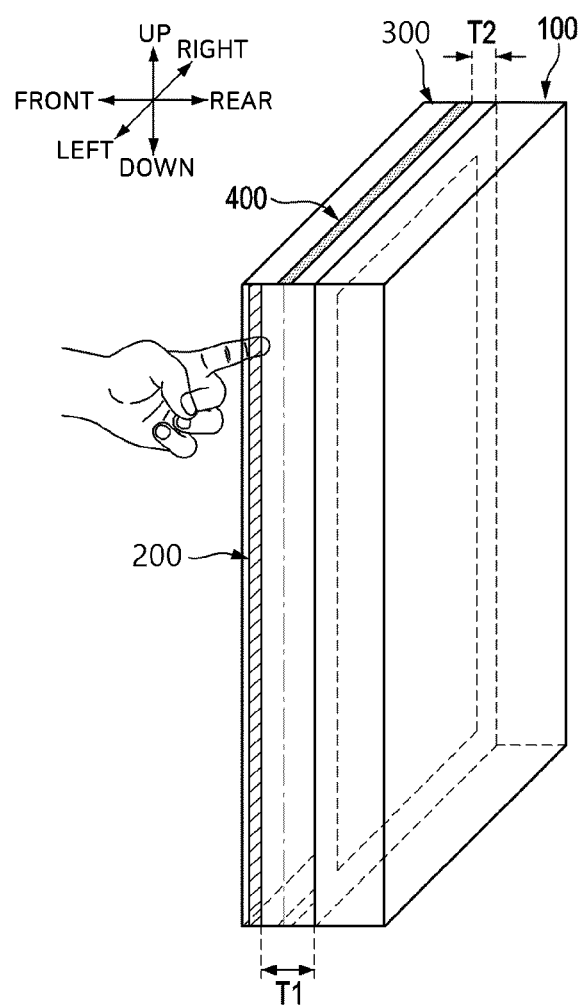
Figure 18:
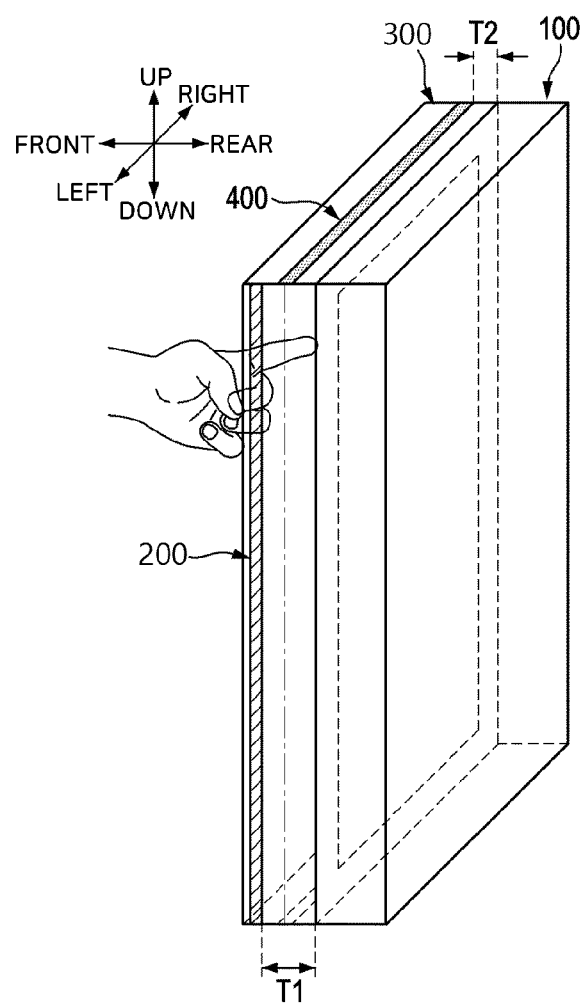

FIG. 16 is a vertical cross-sectional view of a non-contact touch panel display structure having a click-informing function according to the fifth embodiment of the present disclosure, FIG. 17 is a view showing a portion where input coordinates are sensed in the fifth embodiment of the present disclosure, and FIG. 18 is a view showing a portion where a touch is sensed in the fifth embodiment of the present disclosure.

As shown in FIG. 14, the click-informing unit 400 according to the present disclosure is spaced apart forward from the display 100 and is coupled to the frame 300 at the upper and lower sides of the display 100.

In other words, according to the present disclosure, the touch screen 200 is disposed at the left and right sides of the display 100 and the click-informing unit 400 is disposed at the upper and lower sides of the display 100, thereby achieving dualization.

Similar to the touch screen 200 described above, the click-informing unit 400 is spaced apart outward from the upper and lower outer edges of the display 100 with a predetermined gap G2 in the up-down direction.

The gap G2 in the up-down direction between the click-informing unit 400 and the display 100 may be the same as the gap G1 in the left-right direction between the touch screen 200 and the display 100, or may be different, depending on situations.

The click-informing unit 400 is disposed on the center of the frame inclination surface 310 of the frame 300. Unlike that the touch screen 200 is coupled to the front end of the frame 300, the click-informing unit 400 is positioned a slightly lower.

In other words, the gap T2 in the front-rear direction between the click-informing unit 400 and the display 100 is smaller than the gap T1 in the front-rear direction between the touch screen 200 and the display 100.

When there is an item that a user wants to select in an image or a picture displayed on the display 100, as shown in FIG. 17, the user puts a finger into the region (a coordinate recognition section) in which the touch screen 200 is disposed, whereby the position of the input coordinates is sensed.

Next, when the user finishes selection, as shown in FIG. 18, the user further puts the finger inside to click the item like a click button on a mouse for a computer and then selection of the item is finished when the user's finger comes into the region (the click recognition section) in which the click-informing unit 400 is disposed.

When the user finishes selection, as described above, the first light emitter 501 generates light with another color, so the user can recognize whether the item that he/she wants has been accurately selected.

As described above, the touch screen 200 is disposed relatively far away from the display 100 and the click-informing unit 400 is disposed relatively close to the display 100, so the touch screen 200 can recognize input coordinates and the click-informing unit 400 can inform a user whether selection (a click) is completed. Accordingly, the present disclosure has the advantage that it is possible to achieve the same effect when a user clicks an item using a computer mouse.

Meanwhile, the click-informing unit 400 includes a Y-axial transmitter 410 disposed on one side of the frame 300 at the upper and lower sides of the display 100 and generate infrared rays and a Y-axial receiver 420 disposed on another side of the frame to face the Y-axial transmitter and senses a generated signal.

That is, the X-axial transmitter 250 and the X-axial receiver 260 of the touch screen 200 are disposed at the left and right sides of the display 100, and the Y-axial transmitter 410 and the Y-axial receiver 420 of the click-informing unit 400 are disposed at the upper and lower sides of the display 100.

There may be different in that the X-axial transmitter 250 includes several infrared LEDs to create coordinates, but the Y-axial transmitter 410 may have one infrared LED-bar.

The click-informing unit 400 including the Y-axial transmitter 410 and the Y-axial receiver 420 is used for click information recognized in the same way at any positions rather than coordinates, so it can be implemented as a single infrared LED-bar.

Figure 19:
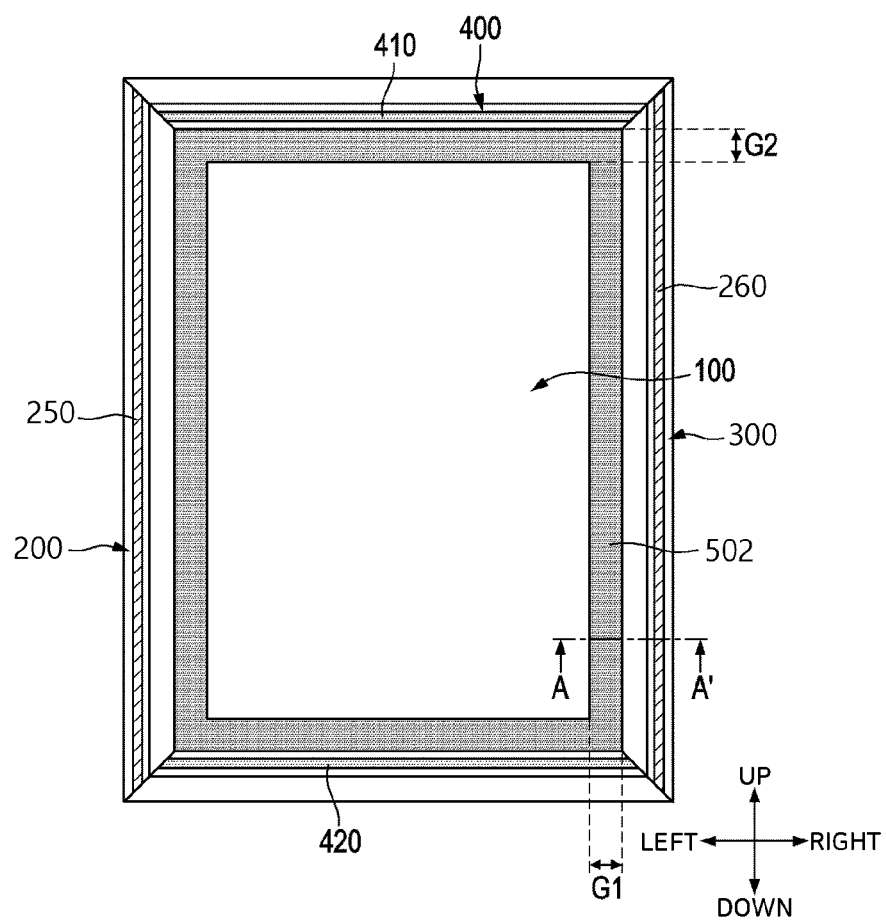
Figure 20:
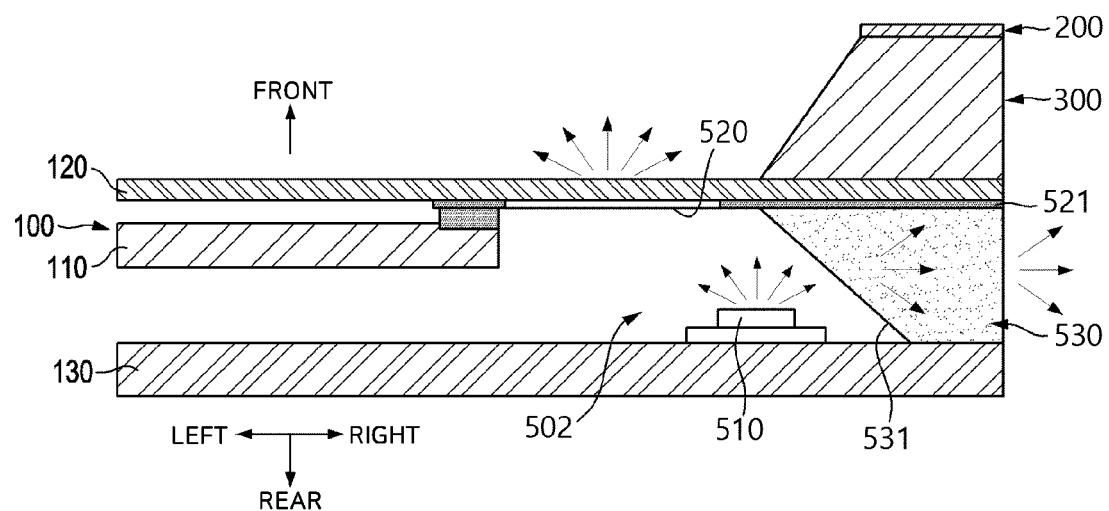
FIG. 20 is a view schematically showing a cross-section of a second light emitter taken along line A-A' shown in FIG. 19.

FIG. 19 is a view showing the front of a click-information non-contact touch panel display structure according to a sixth embodiment of the present disclosure and FIG. 20 is a view schematically showing a cross-section of a second light emitter taken along line A-A' shown in FIG. 19.

As shown in FIGS. 19 and 20, in the sixth embodiment of the present disclosure, a second light emitter 502 may be further mounted in the gap G1 in the left-right direction between the display 100 and the touch screen 200 or the gap G2 in the up-down direction between the display 100 and the click-informing unit 400.

The second light emitter 502 may be disposed at various positions, depending on situations, that is, the second light emitter 502 may be disposed at all of the upper, lower, left, and right sides of the gap G1 in the front-rear direction between the display 100 and the touch screen 200 or the gap G2 in the up-down direction between the display 100 and the click-informing unit 400, or only at the upper and lower side or the left and right sides.

The second light emitter 502, similar to the first light emitter 501, emits light when a touch (selection) by a user is sensed by the click-informing unit 400 so that the user can easily visually recognize that the touch (selection) is completed.

The first light emitter 501 and the second light emitter 502 may be installed separately or together, depending on situations, or the first light emitter 501 may be disposed at a side of the display 100 and the second light emitter 502 may be disposed at another side, that is, they may be disposed in various ways.

The second light emitter 502 is formed to be able to cover a portion of the front surface of the display 100 and is disposed in parallel with the longitudinal direction of the touch screen 200 or the click-informing unit 400.

The display 100 includes a liquid crystal unit 110 providing a display screen and a glass unit 120 disposed ahead of the liquid crystal unit. The pictures or images displayed on the display screen of the liquid crystal unit 110 are shown to the outside through the glass unit 120.

The glass unit 120 may extend outward further than the upper, lower, left, and right outer edges of the liquid crystal unit 110. That is, when the glass unit 120 overlaps the liquid crystal unit 110, the glass unit 120 is relatively larger than the liquid crystal unit 110.

As shown in FIG. 20, the second light emitter 502 according to the sixth embodiment of the present disclosure includes a light source 510, a discharger 520, and a diffusion plate 530.

The light source 510 is disposed at a side behind the glass unit 120 and radiates light forward. For example, the light source 510 may be coupled to a metal frame 130 disposed behind the glass unit 120 and may radiate light toward the glass unit 120.

When a user puts a finger close to the touch screen and then puts the finger into the click-informing unit 400 to click a desired point, input coordinate data and a touch selection signal are received from a touch module and the light source 510 is operated in response to the signal.

The discharger 520 is attached to the rear surface of the glass unit 120 outside the liquid crystal unit 110 and transmits the light radiated from the light source 510 such that the light can be discharged from the glass unit 120.

The discharger 520 may be made of a transparent material or a translucent material to be able to transmit the light radiated from the light source 510. The light radiated from the light source 510 travels outside through the discharger 520 and the glass unit 120.

A blocker 521 that blocks the light radiated from the light source 510 is attached to the rear surface of the glass unit 120 outside the discharger 520. The blocker 521 may be made of an opaque material.

The blocker 521 prevents the light radiated from the light source 510 from being discharged to areas excepting the discharger 520, thereby improving a touch recognition ability of a user.

The diffusion plate 530 may be further coupled behind the glass unit 120. The diffusion plate 530 is disposed relatively outside and transmits the light radiated from the light source 510 such that the light can be discharged out of the display 100.

The inner surface of the diffusion plate 530 forms a diffusion inclination surface 531 at an acute angle with respect to the glass unit 120 and the outer surface of the diffusion plate 530 is perpendicular to the glass unit 120. That is, the diffusion plate 530 entirely has a right trapezoidal cross-section.

A portion of the light radiated from the light source 510 hits against the diffusion inclination surface 531 to be reflected into the diffusion 530 and is then discharged out of the diffusion plate 530.

In other words, a portion of the light radiated from the light source 510 is discharged forward from the glass unit 120 through the discharger 520 and the other of the light radiated from the light source 510 is discharged out of the diffusion plate 530 through the diffusion plate 530.

As described above, according to the present disclosure, the light radiated from one light source 510 can travel to both of the discharger 520 and the diffusion plate 530, so a user can easily recognize whether a touch (selection) is completed and other people standing around can easily recognize whether the product is used.

The diffusion plate 530 may also be made of a transparent material or a translucent material. Further, a user can set low brightness for the light discharged from the discharger 520 to prevent dazzling by making the transparency of the discharger 520 and the diffusion plate 530 different and can set high brightness for the light discharged from the diffusion plate 530 to make the light be more easily recognized.

The present disclosure provides an integrally modularized detachable input device for implementing a non-contact touch. Since a non-contact touch input device is integrally modularized, it can be easily installed in existing touch displays and can be easily replaced when it breaks.

A modularized detachable input device for implementing a non-contact touch according to an embodiment of the present disclosure has a haptic function that recognizes a user that non-contact input is completed.

Figure 21:
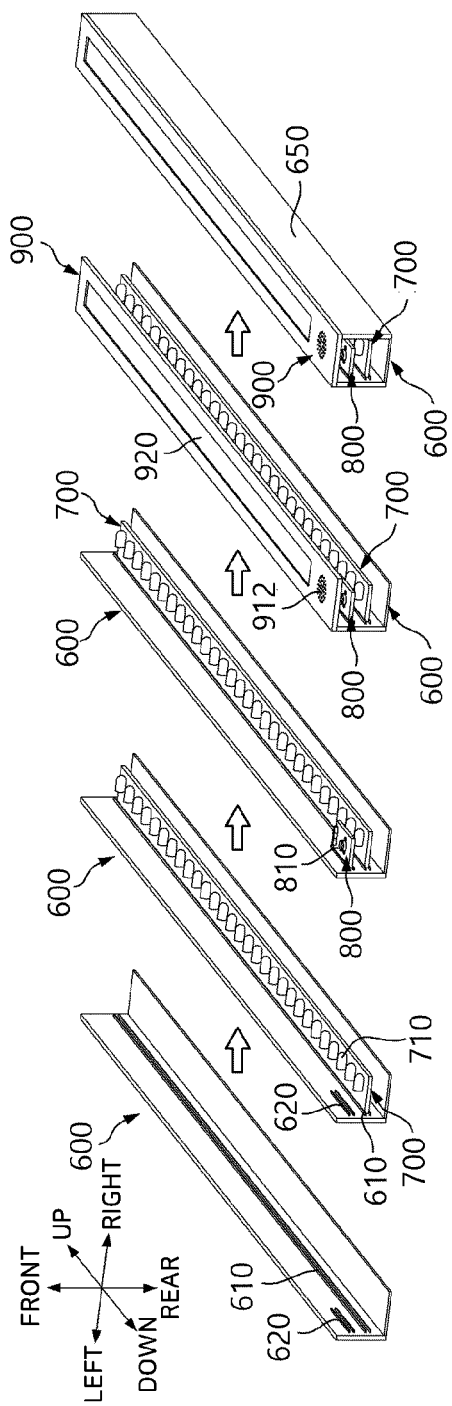
FIG. 21 is a flowchart for assembling a modularized detachable input device for implementing a non-contact touch according to an embodiment of the present disclosure.

FIG. 21 is a flowchart for assembling a modularized detachable input device for implementing a non-contact touch according to an embodiment of the present disclosure.

As shown in FIG. 21, a modularized detachable input device for implementing a non-contact touch according to the present disclosure includes a body casing 600, a touch board 700, a haptic board 800, and a light emitter 900.

The body casing 600, which is a bar that is long up and down, has a left plate and a right plate that make a right angle, thereby having an L-shaped cross-section. Several rails are longitudinally formed on the inner surface of the left plate of the body casing 600 and a rear plate is a bottom.

The rails are composed of a first rail 610 longitudinally elongated as long as the body casing 600 so that the touch board 700 to be described below can be inserted therein, and a second rail 620 formed shorter than the first rail 610 so that the haptic board 800 is inserted therein.

The touch board 700 is inserted in the first rail 610 and disposed inside the body casing 600 and senses the input coordinates of a touch input in a non-contact type by a user. The touch board 700 is formed in a long bar shape in the longitudinal direction of the body casing 600.

The touch board 700 has several infrared transmitters or receivers 710. Several transmitters are disposed on the touch board 700 disposed at a side of the display 600 and generates infrared rays, etc., and several receivers is disposed on another side of the display 600 to face the transmitters and sense generated signals.

The transmitters and the receivers 710 for virtual infrared lines, and when a user blocks a line using a finger, output decreases at the blocked portion, so it is possible to determine the position of the input coordinates.

The haptic board 800 is inserted in the second rail 620 and disposed inside the body casing 600 and includes a speaker 810 that outputs a sound when a touch signal is sensed so that a user can recognize it. Though not shown, a control module, etc. are disposed inside the haptic board 800, whereby it is possible to control the speaker 810 or a light source 930 to be described below.

The light source 800 is positioned at the front of the body casing 600 and coupled to the left plate of the body casing 600, thereby covering the front of the body casing 600. Since the light source 900 is positioned at the front of the body casing 600, when the touch board 700 senses a touch signal by a user, the light source 900 emits light. In this case, the user can visually recognize the light.

A finishing member 650 is coupled to the right side of the body casing 600 such that the body casing 600 has a hollow closed rectangular cross-section. The finishing member 650 prevents the parts in the body casing 600 from being exposed to the outside. The finishing member 650 may be made of a material that can transmit the infrared rays generated from the touch board 700 (e.g., a material having an IR pass filter).

Since the modularized detachable input device for implementing a non-contact touch according to the present disclosure is configured in an integral type having a built-in haptic board 800, unnecessary parts are not provided, so the manufacturing cost is low. Further, the input device can be detachably installed in a display, so maintenance is easy.

Figure 22:
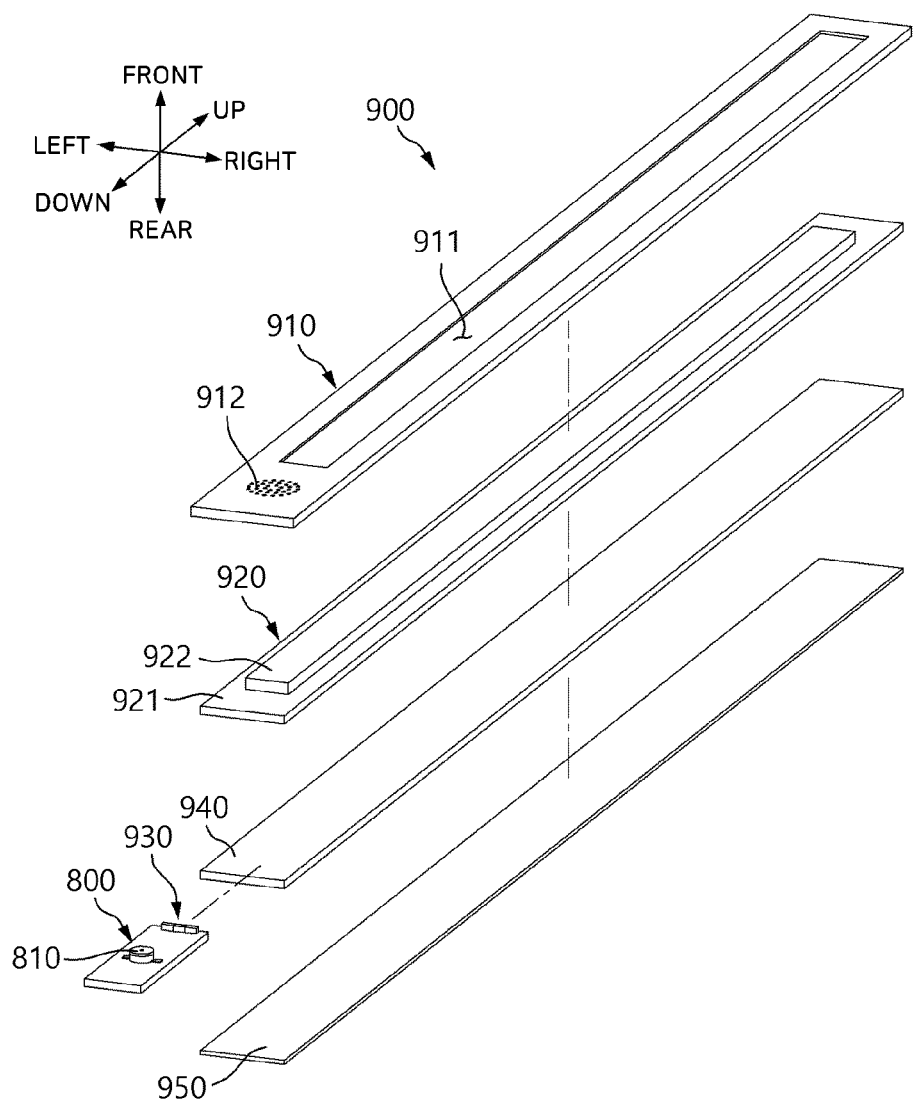
FIG. 22 is a view showing a light emitter, a haptic board, and a touch board according to an embodiment of the present disclosure.

FIG. 22 is a view showing a light emitter, a haptic board, and a touch board according to an embodiment of the present disclosure. As shown in FIG. 22, the light emitter 900 according to an embodiment of the present disclosure includes a light source casing 910, a light diffusion cover 920, a light source 930, a light guide plate 940, and a reflection sheet 950, and emits light when a touch signal is sensed by the touch board 700.

The light source casing 910 is coupled to a side (the front surface in the shown embodiment) of the body casing 600 and has a light source hole 911. The light source hole 911 is one hole and is elongated in the longitudinal direction of the light source casing 910.

Several sound holes 912 are formed in the other side where the light source hole 911 is not formed in the light source casing 910. The sound holes 912 are formed at a position corresponding to the speaker 810 so that the sound output from the speaker 810 can be discharged outside.

The diffusion cover 920 is inserted in the light source hole 911 and transmits light frontwards. The diffusion cover 920 may be made of a transparent material or a translucent material to be able to transmit radiated light. As shown in FIG. 22, the light diffusion cover 920 has a diffusion base 921 formed to be able to come in contact with the front surface of the light guide plate 940, and a diffusion insert 922 protruding from the front surface of the diffusion base and having a size smaller than the diffusion base 921 to be able to be inserted in the light source hole 911.

Since the light diffusion cover 920 has two steps, a user can fasten the light diffusion cover 920 to the light source casing 910 at the accurate position and there is no assembly tolerance, so anybody can easily assemble them even if he/she is not a professional.

The light source 930 is coupled to a side of the haptic board 800 and radiates light upward. That is, in an embodiment of the present disclosure, the speaker 810 and the light source 930 are coupled to the haptic board 800 and the light radiated from the light source 930 is transmitted to the light guide plate 940.

The light source 930 can emit with various colors such as red or green, depending on situations, and the speaker 810 can output various sounds.

The light guide plate 940 is coupled to the rear surface of the diffusion base 921 and diffuses the light radiated from the light source 930 toward the light diffusion cover 920. The reflection sheet 950 is coupled to the rear surface of the light guide plate 940 and reflects light forward.

When a touch signal is sensed by the touch board 700, light is radiated from the light source 930, and the radiated light travels through the light guide plate 940 and the light diffusion cover 920, and is then discharged frontwards through the light source hole 911.

Further, when a touch signal is sensed by the touch board 700, the speaker 810 coupled to the haptic board 800 also output a sound such that the sound can be discharged frontwards through the sound holes 912. The light source 930 and the speaker 810 may be controlled to operate together or to separately operate when a touch signal is sensed.

As described above, according to the present disclosure, when a touch is sensed, it is possible to inform the user of the touch using light and a sound, so the user can clearly recognize whether a touch is completed.

Figure 23:
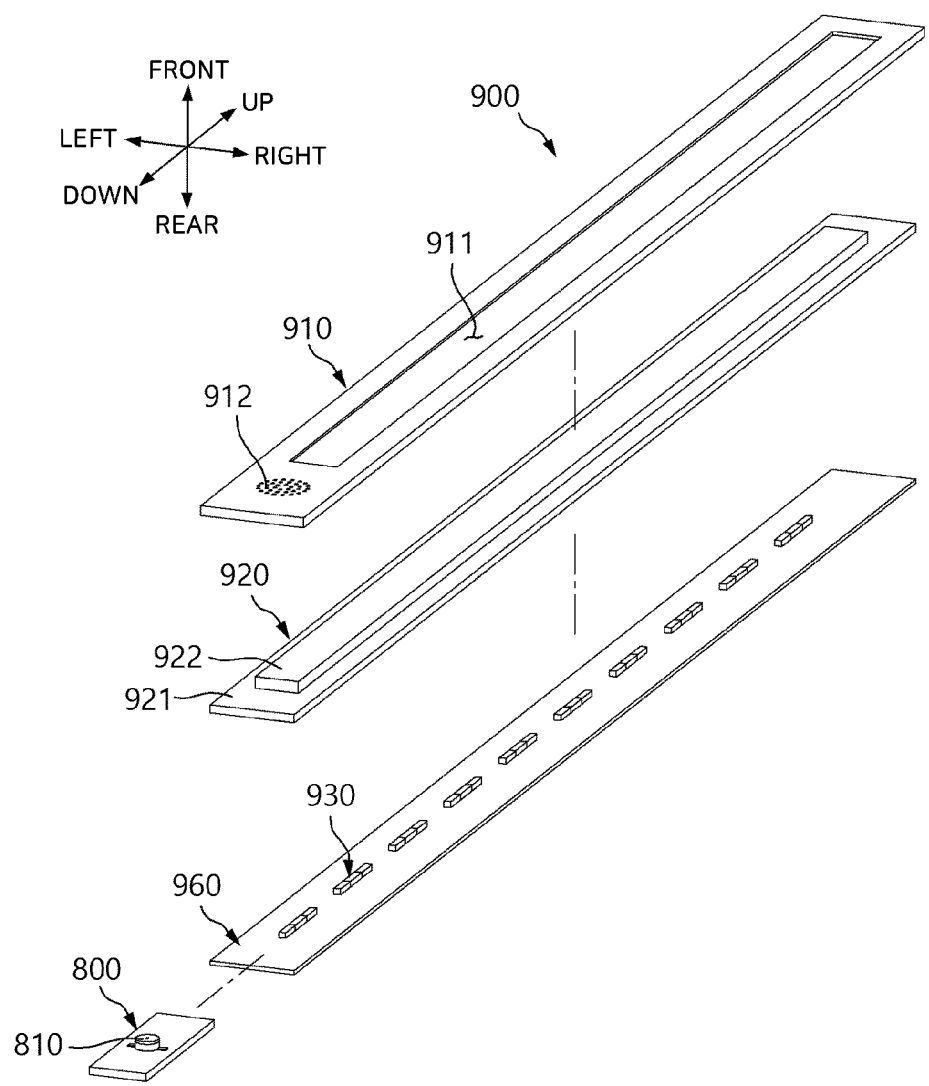
FIG. 23 is a view showing a light emitter, a haptic board, and a touch board according to a second embodiment of the present disclosure.

FIG. 23 is a view showing a light emitter, a haptic board, and a touch board according to a second embodiment of the present disclosure.

As shown in FIG. 23, the light emitter 900 according to the second embodiment of the present disclosure includes a light source casing 910, a light diffusion cover 920, and a lighting module 960, and emits light when a touch signal is sensed by the touch board 700.

Similar to an embodiment of the present disclosure, the light source casing 910 according to the second embodiment is coupled to a side of the body casing 600 and has a light source hole 911. The light source hole 911 is one hole and is elongated in the longitudinal direction of the light source casing 910.

Several sound holes 921 are formed in the other side where the light source hole 911 is not formed in the light source casing 910. The sound holes 912 are formed at a position corresponding to the speaker 810 so that the sound output from the speaker 810 can be discharged outside.

The diffusion cover 920 is inserted in the light source hole 911 and transmits light frontwards. The diffusion cover 920 may be made of a transparent material or a translucent material to be able to transmit radiated light.

The light diffusion cover 920 according to the second embodiment of the present disclosure has a diffusion base 921 formed to be able to come in contact with the front surface of the lighting module 960, and a diffusion insert 922 protruding from the front surface of the diffusion base and having a size smaller than the diffusion base 921 to be able to be inserted in the light source hole 911.

Since the light diffusion cover 920 has two steps, a user can fasten the light diffusion cover 920 to the light source casing 910 at the accurate position and there is no assembly tolerance, so anybody can easily assemble them even if he/she is not a professional.

Unlike an embodiment of the present disclosure, the light source 930 according to the second embodiment of the present disclosure is mounted on the lighting module 960 coupled to the rear surface of the light diffusion cover 920. The light source 930 radiates light forward.

That is, only the speaker 810 is coupled to the haptic board 800 and the light source 930 is coupled to the lighting module 960 in the second embodiment of the present disclosure. The light radiated from the light source 930 is directly discharged frontwards through the light diffusion cover 920.

The light source 930 is provided as several pieces, which are spaced apart from each other and coupled to the front surface of the lighting module 960. The lighting module 960 may be electrically connected to the haptic board 800 to be able to be controlled.

When a touch signal is sensed by the touch board 700, light is radiated from the light sources 930 and the radiated light travels through the light diffusion cover 920 and is then discharged frontwards through the light source 911. Further, the speaker 810 coupled to the haptic board 800 also outputs a sound such that the sound can be discharged outside through the sound holes 912.

Figure 24:
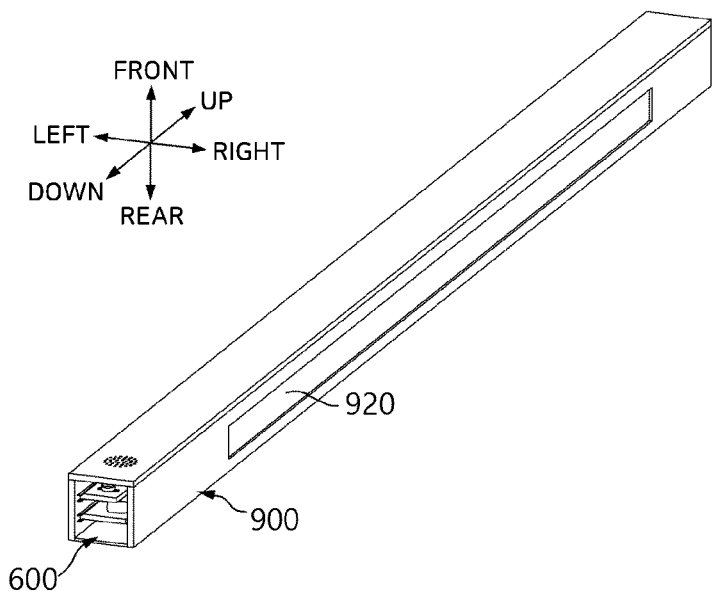
FIGS. 24 and 25 are views showing various types of modularized detachable input devices for implementing a non-contact touch according to other embodiments of the present disclosure.
Figure 25:
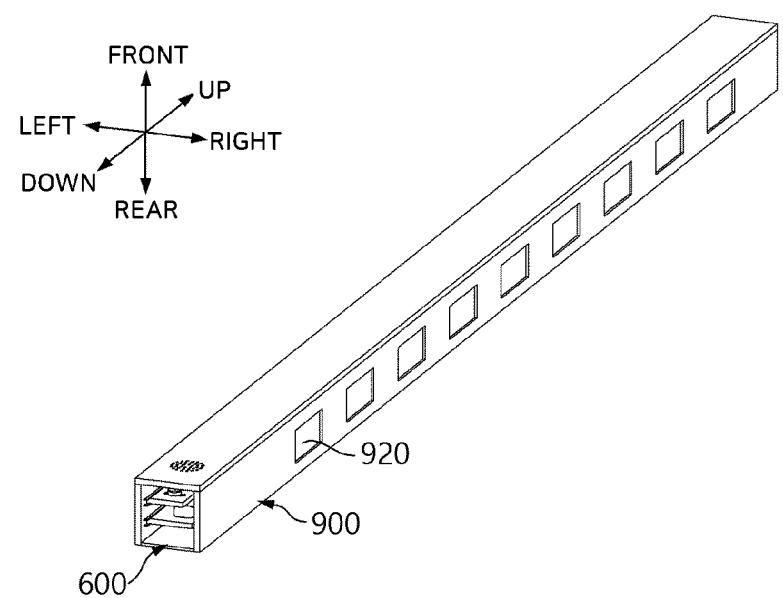

FIGS. 24 and 25 are views showing various types of haptic-integrated detachable input devices for implementing a non-contact touch according to other embodiments of the present disclosure. Unlike that the light emitter 900 according to an embodiment of the present disclosure (see FIGS. 21 and 22) is coupled to the front surface of the body casing 600, in another embodiment of the present disclosure, the light emitter 900 is coupled to a side of the body casing and emits light when a touch signal is sensed, as shown in FIG. 24.

That is, the light radiated from the light emitter 900 according to another embodiment of the present disclosure travels to the display 600 or to the front of the display 600 so that other users can easily recognize that the display 600 is used.

As described above, when a touch signal is sensed by the touch board 700, the light emitter 900 emits light, and the speaker 810 coupled to the haptic board 800 also discharges a sound such that the sound can be discharged outside.

When a touch signal by a user is sensed, the light emitter 900 and the speaker 800 may be controlled to operate together or to separately operate, depending on situations.

As shown in FIG. 24, one light source hole 911 is elongated in the longitudinal direction of the light source casing 410 and one light diffusion cover 920 is also elongated to correspond to the shape of the light source hole 911.

The light emitter 900 shown in FIG. 25, similar to the light emitter 900 shown in FIG. 24, is coupled to a side of the body casing 600 and emits light to the display 600 or to the front of the display 600.

However, the light emitter 900 shown in FIG. 25 has several light source holes 911 and the light source holes 911 are spaced apart from each other in the longitudinal direction of the light source casing 910, which is different from the light emitter 900 shown in FIG. 24.

Further, the light diffusion cover 920 may also have several diffusion inserts 920 protruding from the front surface of the diffusion base 921 to correspond to the shape of the light source holes 911.

The diffusion inserts 922 may have different transparencies so that the amounts of discharged light can be different or may have different colors so that the discharged light has different colors.

In other words, in the present disclosure, a user can change the position of the light emitter 900 in the body casing 600 or change the shape of the light diffusion cover 920 in consideration of various situations.

Figure 26:
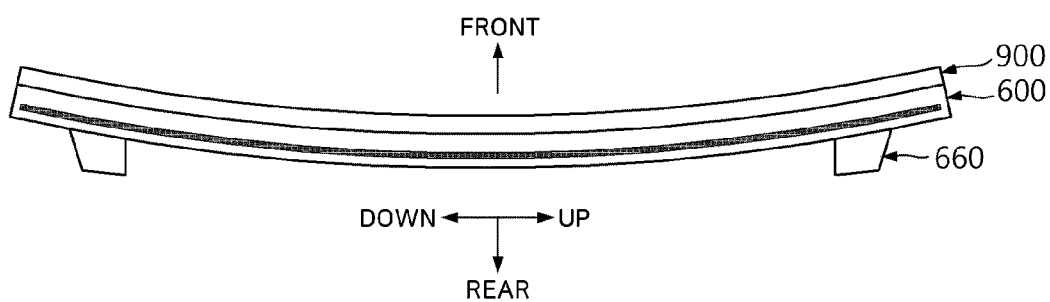
FIG. 26 is a view showing a side of a modularized detachable input device for implementing a non-contact touch according to another embodiment of the present disclosure.

FIG. 26 is a view showing a side of a modularized detachable input device for implementing a non-contact touch according to another of the present disclosure and FIGS. 27 to 31 are views showing various cases when a modularized detachable input device for implementing a non-contact touch according to the present disclosure is combined with a display.

As shown in FIG. 26, in another embodiment of the present disclosure, the body casing 600 is formed in an arc shape having a predetermined curvature and the light emitter 900 is formed in an arc shape corresponding to the shape of the body casing 600.

That is, in the present disclosure, all part including the body casing 600 and the light emitter 900 may be formed in various shapes such a straight shape, an arc shape, and a diagonal shape to correspond to the shape of the display 600.

A coupler 660 may be further coupled to the rear surface of the body casing 600. The coupler 660 connects the body casing 600 and the display 600 such that the body casing 600 can be mounted at the front of the display 600.

The coupler 660 has a predetermined height in the front-rear direction, and accordingly, the non-contact input device including the body casing 600 may be spaced a predetermined gap apart from the front of the display 600.

As described above, since the body casing 600 having the touch board 700 therein is spaced apart from the display 600 in the front-rear direction, there is little possibility that a user directly touches the display 600, and accordingly, there is an effect that the possibility of exposure to bacterial infection is remarkably reduced.

Further, since the non-contact input device can be easily detachably coupled to the display 600 installed in advance in the present disclosure, there is the advantage that maintenance is easy and it is possible to install the non-contact input device in various ways regardless of the shape of the display 600.

Figure 27:
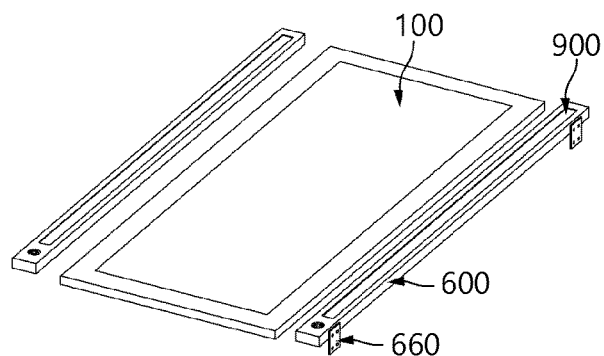
FIGS. 27 to 31 are views showing various cases when a modularized detachable input device for implementing a non-contact touch according to the present disclosure is combined with a display.

As shown in FIG. 27, the modularized detachable input device for implementing a non-contact touch which includes the body casing 600, the light emitter 900, etc. may be implemented as two bars, which may be coupled to both sides of the display 600. In this embodiment, the body casing 600 is formed in a straight bar shape and is coupled to the front surface of the display 600 through the coupler 660.

Figure 28:
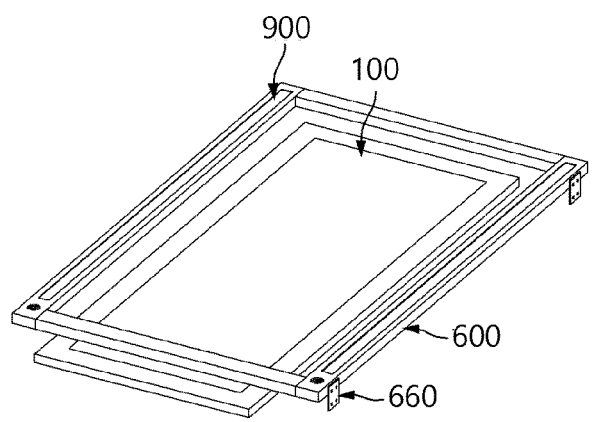

Further, as shown in FIG. 28, the haptic-integrated detachable input device including the body casing 600, the light emitter 900, etc. may be implemented as four bars, which may be coupled to the upper, lower, left, and right sides of the display 600. Similarly, in this embodiment, the body casing 600 is formed in a straight bar shape and is coupled to the front surface of the display 600 through the coupler 660.

Figure 29:
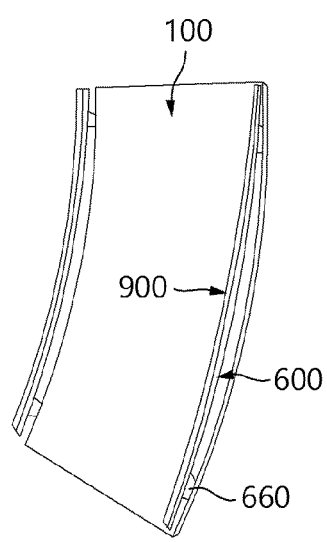

Meanwhile, as shown in FIG. 29, the modularized detachable input device for implementing a non-contact touch including the body casing 600, the light emitter 900, etc. may be formed in an arc shape having a predetermined curvature. In this embodiment, the modularized detachable input device for implementing a non-contact touch may be coupled to both sides of the display 600 and may have the same length as the display 600 in the up-down direction.

Figure 30:
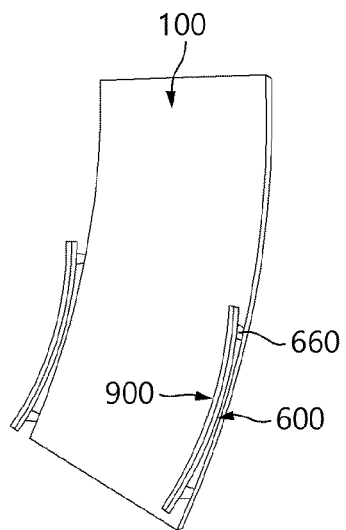

Further, as shown in FIG. 30, the modularized detachable input device for implementing a non-contact touch including the body casing 600, the light emitter 900, etc. may have a length smaller than that of the display 600 in the up-down direction and may be coupled to the lower end of the display 600. In this embodiment, the body casing 600 is formed in an arc shape.

Figure 31:
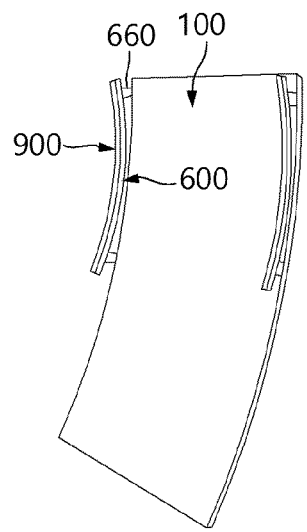

Further, as shown in FIG. 31, the modularized detachable input device for implementing a non-contact touch including the body casing 600, the light emitter 900, etc. may have a length smaller than that of the display 600 in the up-down direction and may be coupled to the upper end of the display 600. In this embodiment, the body casing 600 is formed in an arc shape.

Figure 32:
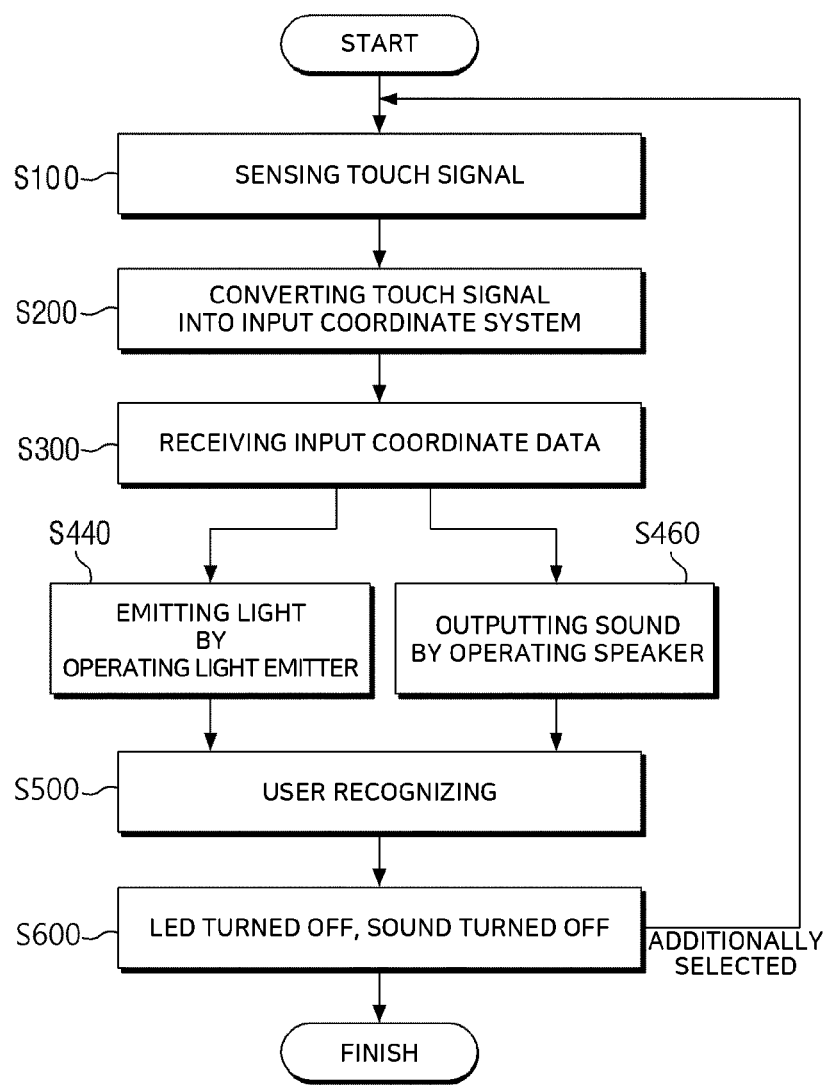
FIG. 32 is a flowchart showing a method of operating a modularized detachable input device for implementing a non-contact touch according to an embodiment of the present disclosure

FIG. 32 is a flowchart showing a method of operating a modularized detachable input device for implementing a non-contact touch according to an embodiment of the present disclosure.

As shown in FIG. 32, when a user puts a hand close to the display 600 to select a desired item in the screen displayed on the display 600, the touch board 700 disposed ahead of the display 600 senses the motion (S100).

The touch board 700 includes several infrared transmitters or receivers 710, and when a user blocks a virtual infrared line, output decreases at the blocked portion and a touch signal is converted into input coordinates (S200).

As described above, the data converted into the input coordinates are transmitted to a control module disposed in the haptic board 800 and the control module can control the light source 930 of the light emitter 900 and the speaker 810 (S300).

When a touch signal is sensed, light is radiated from the light source 930 and the radiated light travels through the light guide plate 940 and the light diffusion cover 920 and is then discharged frontwards through the light source hole 911 (S440).

The speaker 810 coupled to the haptic board 800 also output a sound such that the sound is discharged outside through the sound holes 912. The light source 930 and the speaker 810 may be controlled to operate together or to separately operate when a touch signal is sensed (S460).

That is, when a touch by a user is sensed, the light emitter 900 and the speaker 810 can inform the user of the touch using light and a sound. As described above, after the informing the user of the touch (S500), the light and sound both may be removed and the user may additionally select an item (S600).

As described above, since the input device for implementing a non-contact touch is configured in an integrated module in the present disclosure, there is an effect unnecessary parts are removed and the manufacturing cost is low. Further, there is an effect that the input device can be detachably installed in existing displays, whereby the maintenance is easy.

Further, according to the present disclosure, there is the advantage that it is possible to directly install the input device for implementing a non-contact couth in a display installed in advance using the coupler 660 and it is possible to easily apply the input device to various types of displays.

Further, according to the present disclosure there is the advantage that it is possible to apply the input device to a curved display and install the input device at the upper end or the lower end of a display so that a non-contact touch can occur in only a predetermined section by reducing the size.

Further, according to the present disclosure, when a touch is sensed, there is the advantage that it is possible to inform the user of the touch using both of light and a sound, so the user can clearly recognize whether a touch is completed.

It will be apparent to those skilled in the art that the foregoing present disclosure is not limited by the foregoing embodiments and the accompanying drawings, and various modifications and changes may be made without departing from the scope and spirit of the present disclosure.

The invention claimed is:

1. A modularized detachable input device for implementing a non-contact touch, the modularized detachable input device comprising:

a bar-shaped body casing having a left plate having several rails longitudinally formed and a rear plate being a bottom, and entirely having an L-shaped cross-section, the left plate and the rear plate making a right angle;

a touch board longitudinally inserted in one of the rails and sensing a position of input coordinates;

a haptic board inserted in another one of the rails;

a speaker coupled to the haptic board and outputting a sound when a touch signal is sensed by the touch board;

a light emitter disposed at a front of the body casing, coupled to the left plate to cover the front of the body casing, and emitting light to the front of the body casing; and a finishing member coupled to a right side of the body casing such that the body casing has a closed rectangular cross-section, wherein the light emitter includes:

a light source casing coupled to a side of the body casing and having a light source hole;

a light diffusion cover inserted in the light source hole of the light source casing and transmitting light frontwards;

a light source coupled to a side of the haptic board and radiating light;

a light guide plate coupled to a rear surface of the light diffusion cover and diffusing light radiated from the light source to the light diffusion cover; and a reflection sheet coupled to a rear surface of the light guide plate, wherein the light diffusion cover includes:

a diffusion base formed to be able to come in contact with a front surface of the light guide plate; and a diffusion insert protruding from a front surface of the diffusion base and having a size smaller than the diffusion base to be able to be inserted in the light source hole, the light guide plate is coupled to an upper portion of the haptic board in a line with the haptic board, and coupled in the body casing with the haptic board when the haptic board is inserted in the another one of the rails, and the light diffusion cover has a two steps including the diffusion base and the diffusion insert, the diffusion insert has the same size as the light source hole, and the diffusion base is disposed between the light source casing and the light guide plate when the diffusion insert is inserted in the light source hole.

2. The modularized detachable input device of claim 1, wherein the rails includes:

a first rail longitudinally elongated such that the touch board can be inserted therein; and a second rail formed to be shorter than the first rail and having the haptic board inserted therein.

3. The modularized detachable input device of claim 2, wherein the touch board is formed in a long bar shape to be able to be inserted in the first rail in a longitudinal direction of the body casing, and having several infrared transmitters and receivers.

4. The modularized detachable input device of claim 1, further comprising:

several sound holes formed at a side of the light source casing such that a sound output from the speaker can be discharged outside.

5. The modularized detachable input device of claim 1, wherein the light emitter further includes:

a lighting module coupled to a rear surface of the light diffusion cover and having the light source mounted therein.

6. The modularized detachable input device of claim 5, wherein the light source is provided as several pieces, which are spaced apart from each other, are coupled to a front surface of the lighting module, and radiate light frontwards.

7. The modularized detachable input device of claim 1, wherein the light emitter is coupled to a side of the body casing and emits light when a touch signal is sensed.

8. The modularized detachable input device of claim 1, wherein the body casing is formed in an arc shape having a predetermined curvature, and the light emitter is formed in an arc shape to correspond to the shape of the body casing.

9. The modularized detachable input device of claim 1, further comprising: a coupler coupled to a rear of the body casing to have a predetermined height frontwards and rearwards.

* * * * *